US007055100B2

(12) United States Patent
Moriwake et al.

(10) Patent No.: US 7,055,100 B2
(45) Date of Patent: May 30, 2006

(54) EDITING SYSTEM, EDITING METHOD, CLIP MANAGEMENT APPARATUS, AND CLIP MANAGEMENT METHOD

(75) Inventors: Katsuakira Moriwake, Tokyo (JP); Hidehiro Hirase, Kanagawa (JP); Nariyasu Hamahata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/068,866

(22) PCT Filed: Sep. 19, 1997

(86) PCT No.: PCT/JP97/03343

§ 371 (c)(1),
(2), (4) Date: Oct. 23, 1998

(87) PCT Pub. No.: WO98/12702

PCT Pub. Date: Mar. 26, 1998

(65) Prior Publication Data

US 2002/0154156 A1    Oct. 24, 2002

(30) Foreign Application Priority Data

Sep. 20, 1996   (JP)   ................................. 8-249381

(51) Int. Cl.
*G06F 3/00*   (2006.01)
(52) U.S. Cl. ...................... 715/723; 715/724; 715/726
(58) Field of Classification Search ................ 345/328, 345/327, 357, 722, 716, 719, 72, 730–732, 345/723–726; 357/356, 386, 348; 386/52, 386/55; 348/722; 715/723, 724, 726, 719; 352/85

See application file for complete search history.

(56) References Cited

U.S. PATENT DOCUMENTS

| | | | | |
|---|---|---|---|---|
| 5,191,645 A * | 3/1993 | Carlucci et al. | ............ | 345/581 |
| 5,206,929 A * | 4/1993 | Langford et al. | ........... | 345/723 |
| 5,404,316 A * | 4/1995 | Klingler et al. | ............. | 345/723 |
| 5,530,501 A * | 6/1996 | Bell et al. | .................... | 369/319 |
| 5,682,326 A * | 10/1997 | Klingler et al. | ............. | 345/723 |
| 5,737,552 A * | 4/1998 | Lavallee et al. | ............. | 348/10 |
| 5,781,188 A * | 7/1998 | Amiot et al. | ............... | 715/723 |
| 5,852,438 A * | 12/1998 | Tomizawa et al. | .......... | 345/328 |
| 5,930,446 A * | 7/1999 | Kanda | ......................... | 345/328 |
| 5,969,716 A * | 10/1999 | Davis et al. | ................ | 345/726 |
| 6,014,137 A * | 1/2000 | Burns | ........................ | 345/747 |
| 6,118,444 A * | 9/2000 | Garmon et al. | ............ | 345/328 |
| 6,137,945 A * | 10/2000 | McGrath | .................... | 345/327 |
| 6,192,183 B1* | 2/2001 | Taniguchi et al. | .......... | 345/723 |
| 6,195,497 B1* | 2/2001 | Nagasaka et al. | ........... | 345/335 |
| 6,204,840 B1* | 3/2001 | Petelycky et al. | ......... | 345/328 |
| 6,321,024 B1* | 11/2001 | Fujita et al. | .................. | 386/52 |

(Continued)

FOREIGN PATENT DOCUMENTS

JP    5-30464    2/1993

(Continued)

*Primary Examiner*—Weilun Lo
*Assistant Examiner*—Truc T. Chuong
(74) *Attorney, Agent, or Firm*—Frommer Lawrence & Haug LLP; William S. Frommer; Darren M. Simon

(57) ABSTRACT

An editing system for producing a resultant clip from a plurality of clips. Information indicating relations between the clips is stored and managed in a database according to a hierarchical structure. The content of a first resultant clip can be updated at any time, and the system automatically updates all other resultant clips that are produced from the first resultant clip.

2 Claims, 26 Drawing Sheets

U.S. PATENT DOCUMENTS

| | | | |
|---|---|---|---|
| 6,346,951 B1 * | 2/2002 | Mastronardi | 345/716 |
| 6,400,886 B1 * | 6/2002 | Brewer et al. | 386/52 |
| 6,404,978 B1 * | 6/2002 | Abe | 386/55 |
| 6,411,771 B1 * | 6/2002 | Aotake | 348/700 |
| 6,469,711 B1 * | 10/2002 | Foreman et al. | 345/723 |
| 6,628,303 B1 * | 9/2003 | Foreman et al. | 715/723 |

FOREIGN PATENT DOCUMENTS

| | | |
|---|---|---|
| JP | 5-174545 | 7/1993 |
| JP | 5-290473 | 11/1993 |

* cited by examiner

| CLIP ID CODE | CLIP NAME | AT-TRIB-UTE | POINTER TO IMAGE DATA | DURATION | PARENT LINK ID CODE | CHILD LINK ID CODE L1 | L2 | L3 | ENABLE/DISABLE FLAG | WORK DATA MODULE ID CODE | EDITING POINT DATA | IMAGE PROCESSING DATA |
|---|---|---|---|---|---|---|---|---|---|---|---|---|
| 001 | MC-001 | M | 8 byte | 00:08:02:10 | 008 | | | | E | | | |
| 002 | MC-002 | M | 8 byte | 00:05:11:00 | 008 | | | | E | | | |
| 003 | MC-003 | M | 8 byte | 00:10:55:01 | 008 | | | | E | | | |
| 004 | MC-004 | M | 8 byte | 00:20:31:07 | 009 | | | | E | | | |
| 005 | MC-005 | M | 8 byte | 01:02:20:29 | | | | | D | | | |
| 006 | MC-006 | M | 8 byte | 00:00:10:00 | | | | | D | | | |
| 007 | MC-007 | M | 8 byte | 00:02:28:18 | | | | | D | | | |
| 008 | FC-008 | F | 8 byte | 00:04:47:00 | 010 | 003 | 002 | 001 | E | C | EDIT P DATA | COMP DATA |
| 009 | FC-009 | F | 8 byte | 00:02:06:00 | 010 | 004 | | | E | S | EDIT P DATA | S-EFFECT DATA |
| 010 | FC-010 | F | 8 byte | 00:05:44:10 | 000 | 008 | 009 | | E | E | EDIT P DATA | EDIT DATA |

FIG. 13

| CLIP ID CODE | CLIP NAME | PARENT LINK ID CODE | CHILD LINK ID CODE L1 | L2 | L3 | ENABLE/ DISABLE FLAG | MODULE ID CODE | WORK DATA EDITING POINT DATA | IMAGE PROCESSING DATA |
|---|---|---|---|---|---|---|---|---|---|
| 001 | MC-001 | 008 | | | | E | | | |
| 002 | MC-002 | 008 | | | | E | | | |
| 003 | MC-003 | 008 | | | | E | | | |
| 004 | MC-004 | 009 | | | | E | | | |
| 005 | MC-005 | | | | | D | | | |
| 006 | MC-006 | | | | | D | | | |
| 007 | MC-007 | | | | | D | | | |
| 008 | FC-008 | 010 | 003 | 002 | 001 | E | C | EDIT P DATA | COMPOSITE DATA |
| 009 | FC-009 | 010 | 004 | | | E | S | EDIT P DATA AFTER MODIFICATION | S-EFFECT DATA AFTER MODIFICATION |
| 010 | FC-010 | 000 | 008 | 009 | | E | E | EDIT P DATA | EDIT DATA |
| 009BK1 | FC-009BK1 | 010 | 004 | | | D | S | EDIT P DATA BEFORE MODIFICATION | S-EFFECT DATA BEFORE MODIFICATION |

FIG. 14

| EDITING POINT DATA | | | | | | | | | | |
|---|---|---|---|---|---|---|---|---|---|---|
| | EDIT-ING POINT | ID | | EP1 | EP2 | EP3 | EP4 | EP5 | EP6 | EP7 | EP8 |
| | | TIME CODE | | | | | | | | | |
| 008 | L1 | IN | 00:00:00:00 | 00:00:42:20 | 00:01:45:15 | 00:01:56:00 | 00:02:32:27 | 00:02:59:20 | 00:03:19:45 | 00:04:47:00 |
| | | OUT | 00:00:31:02 | | | | | | | 00:05:18:02 |
| | L2 | IN | | 00:00:51:00 | | | | | | |
| | | OUT | | | | 00:01:40:03 | | 00:03:04:20 | | |
| | L3 | IN | | | | | | | | |
| | | OUT | | | | | | | 00:02:45:48 | |

FIG. 15

| EDITING POINT DATA | | | | | | | | |
|---|---|---|---|---|---|---|---|---|
| EDIT-ING POINT | ID | | EP1 | EP2 | EP3 | EP4 | EP5 | EP6 | EP7 |
| | TIME CODE | | 00:00:00:00 | 00:00:12:03 | 00:00:31:20 | 00:01:02:50 | 00:01:13:41 | 00:01:40:00 | 00:02:06:00 |
| 009 | L1 | IN | 00:10:12:00 | | | | | | |
| | | OUT | | | | | | | 00:12:18:00 |

FIG. 16

| EDITING POINT DATA | | | | | | | | | |
|---|---|---|---|---|---|---|---|---|---|
| EDITING POINT | ID | EP1 | EP2 | EP3 | EP4 | EP5 | | | |
| | TIME CODE | | | | | | | | |
| 010 | L1 IN | 00:00:00:00 | 00:03:39:00 | 00:03:40:20 | 00:03:42:00 | 00:05:44:10 | | | |
| | L1 OUT | 00:01:01:20 | | | | | | | |
| | L2 IN | | 00:00:00:50 | | 00:04:43:00 | | | | |
| | L2 OUT | | | | | 00:02:06:00 | | | |

FIG. 17

| COMPOSITE DATA | | EP1 | EP2 | EP3 | EP4 | EP5 | EP6 | EP7 | EP8 |
|---|---|---|---|---|---|---|---|---|---|
| 008 | EDITING POINT ID | | | | | | | | |
| | L1 COMPOSITE GAIN | 100 | — | — | — | — | — | — | 100 |
| | L2 COMPOSITE GAIN | | 59 | 100 | — | — | 0 | — | |
| | L3 COMPOSITE GAIN | | | | 100 | 67 | — | 51 | |

FIG. 18

SPECIAL EFFECT DATA

| | | | | | | | | | |
|---|---|---|---|---|---|---|---|---|---|
| 009 | E1 | | | | | | | | |
| | E2 | EFFECT ID | 1025 | | | | | | |
| | | EDIT P ID | EP1 | EP2 | EP3 | EP4 | EP5 | EP6 | EP7 |
| | L1 | Loc X | | 0 | — | 0 | — | −1.6 | −1.6 |
| | | Loc Y | | 0 | — | — | — | 0 | +2.0 |
| | | Loc Z | | 0 | — | — | — | +2.2 | +2.2 |
| | E3 | Rot X | | 0 | — | — | −180 | — | −102 |
| | | Rot Y | | 0 | — | — | — | — | 0 |
| | | Rot Z | | 0 | — | — | — | — | 0 |
| | | Asp | | 0 | — | — | — | — | 0 |
| | | Skew | | 0 | — | — | — | — | 0 |
| | | Pers | | 0 | — | — | — | — | 0 |
| | E4 | | | | | | | | |

FIG. 19

| EDIT DATA | | | | | | |
|---|---|---|---|---|---|---|
| | EFFECT ID | 0001 | | | | |
| 010 | EDIT P ID | EP1 | EP2 | EP3 | EP4 | EP5 |
| | Aspect | | 0 | — | +25 | |
| | Angle | | 0 | +180 | −180 | |
| | Speed | | 20 | 20 | 100 | |
| | H-Mod | | 0 | — | 0 | |
| | V-Mod | | 0 | — | 0 | |

FIG. 20

EDITING SYSTEM, EDITING METHOD, CLIP MANAGEMENT APPARATUS, AND CLIP MANAGEMENT METHOD

TECHNICAL FIELD

The present invention relates to an editing system, and more particularly, is applicable to an editing system for performing edit processing by using a plurality of materials.

BACKGROUND ARTS

Recently, in the field of postproduction which edits the video data obtained from a video camera, a nonlinear editing system which uses a disc as a recording medium for recording the data of materials has been proposed. There are various types of edit processing as an editing processing performed in the nonlinear editing system. For example, they are the video edit processing for combining a plurality of materials to produce a desired video program, the composite processing for composing a plurality of materials by key signal, the special effect processing for applying the special effects to materials, and so on. Generally, the video edit processing is performed at an editing device, the composite processing is performed at a video switcher, and the special effect processing is performed at a special effect device.

In recent years, the development of a disc recording medium in its random access function makes it possible to access to a plurality of channels simultaneously. As a result, the edit processing for processing video data of a plurality of channels in real time has been desired. For example, in the television world in which television commercial messages are edited and produced or in the movie world in which movie programs are edited and produced, it is desired to use a dozens of materials to several hundred materials and to combine some different edit processings. More over, it is required to produce a complicated and high degree of edit resultant data by performing the several kinds of edit processing repeatedly.

To produce the complicated and high degree of edit resultant data, it is needed to control a dozen of materials to several hundred materials and to store the history of the edit processing.

However, in a conventional editing system, there is no device for controlling a lot of materials and no device for storing the edit history, so that the editing operation has became complicated. More specifically, an edit operator (hereinafter, referred to as "operator" shortly) can not remember the information that which material has been used and which edit processing has been performed when the edit resultant video data has been produced. Therefore, in the conventional editing system, the operator has managed the information by writing in a paper whenever the editing is performed. Further, in the case of the complicated edit processing such that a newly edit resultant video data is repeatedly produced from a plurality of edit resultant video data, the information of the editing history that which of materials is the final edit resultant video data produced from becomes large size of data, so that it has been impossible for the operator to manage the information by writing in a paper.

Also, in the conventional editing system, the operator needs to operate the device corresponding to the edit processing for each edit processing. Therefore, the edit works become complicated terribly. For instance, when two video data are composed, the operator needs to operate a control panel connected to a switcher device. When the special effect is applied to video data, the operator needs to operate a key board of the special effect device. There has been a problem that the device to be operated is changed in accordance with the edit processing so as to take much time to edit.

DISCLOSURE OF INVENTION

This invention is to solve the problems described above, and to provide an editing system which can realize the simplified and high-speed edit by managing a plurality of materials with the original hierarchical structure. Further, based on the management information, this invention is to realize the simplified and high-speed edit by managing a plurality of materials to be the most suitable for the edit processing.

Further, this invention is to provide an editing system which can perform various edit processings such as the edit processing, composite processing and special effect processing by manipulating one computer without operating respective devices by an operator. Also, this invention is to provide an editing system for producing the complicated and high degree of edit resultant data which can not be realized by a conventional editing system. Furthermore, this invention is to provide an editing system having the optimum Graphical User Interface (GUI) to manage a plurality of materials with the hierarchical structure and to produce the complicated and high degree of the edit resultant data. The GUI simplifies the edit works and improves the usage of the edit operation.

To solve the above problems, according to this invention, an editing system for producing the edit resultant clip from a plurality of clips to be edited is provided with editing means, which consists of a plurality of processing modules for editing the clips to be edited, for producing the edit resultant clip by performing the edit processing corresponding to the processing module selected among from the plurality of processing modules on the plurality of clips to be edited, managing means for managing with the hierarchical structure the edit resultant clip and the plurality of clips to be edited in order to show that which of clips to be edited is the edit resultant clip produced from, and control means for controlling the editing means based on the information managed by the managing means.

The relation between the edit resultant clip and the clips to be edited can be obtained by managing means. Thus, the edit resultant clip is produced based on the information showing the relation between the clips kept in the managing means, so as to perform the complicated edit works easily.

Further, according to this invention, the editing system for editing a plurality of clips to be edited is provided with editing means, which consists of a plurality of processing modules for editing the clips to be edited, for producing the edit resultant clip by performing the edit processing corresponding to the processing module selected among from the plurality of processing modules on the plurality of clips to be edited, display means for displaying the graphical user interface corresponding to the plurality of processing modules on a display, storing means for storing image processing data showing the content of image processing performed by the edit processing applied to the video data of the clips to be edited, correspondingly to the edit resultant clip, and control means for controlling the display means to display the image processing data stored in the storing means which corresponds to the selected edit resultant clip on a display as a part of the graphical user interface when the edit resultant clip is selected.

When the edit resultant clip is selected, the image processing data showing the content of the image processing is displayed on a display as a part of the graphical user interface, so that the edit operator looks at the display to understand the content of the specified image processing easily.

BRIEF DESCRIPTION OF DRAWINGS

FIG. 13 is a table showing a database for clip management data registered in a clip database;

FIG. 14 is a table explaining the database when the clip management data which already has been registered is modified;

FIG. 15 is a table showing the editing point data in the composite processing;

FIG. 16 is a table showing the editing point data in the special effect processing;

FIG. 17 is a table showing the editing point data in the edit processing;

FIG. 18 is a table showing the composite data in the composition processing;

FIG. 19 is a table showing the special effect data at the special effect processing;

FIG. 20 is a table showing the editing data in the edit processing;

BEST MODE FOR CARRYING OUT THE INVENTION (1) The Whole Construction of Editing System First, the whole construction of the editing system of this invention will be described referring to FIG. 1.

Figure 1:
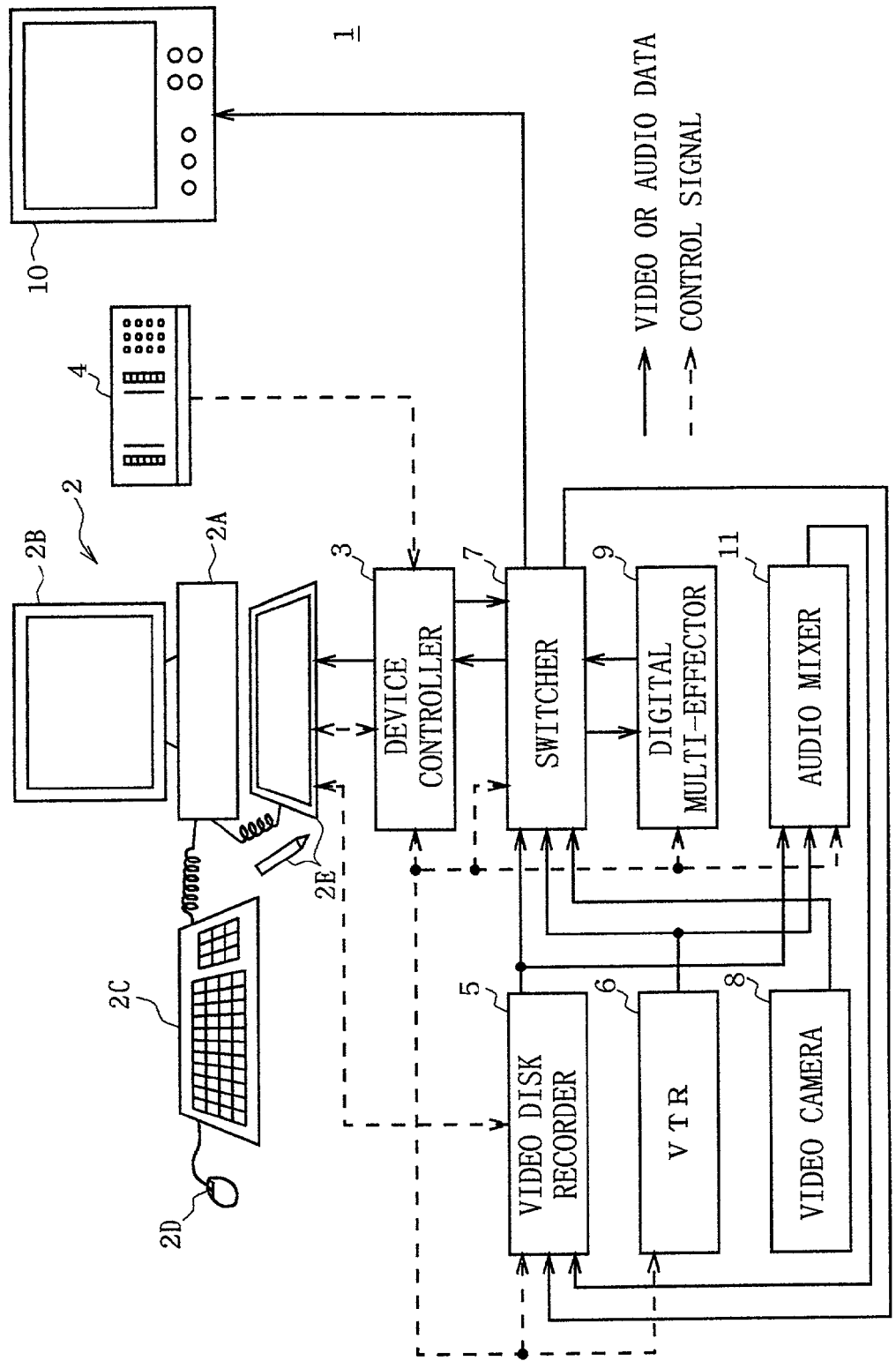
FIG. 1 shows a block diagram showing the construction of an editing system according to the present invention.

In FIG. 1, 1 shows the editing system according to this invention, which has a work station 2 for controlling the system entirely. The work station 2 has a body 2A provided with a central processing unit (CPU), various processing circuits, a floppy disc drive, a hard disk drive, and so on, a display 2B connected to the body 2A, a key board 2C, a mouse 2D, and a pen tablet 2E. In the work station 2, an application software for editing has been previously installed in the hard disk drive. The application software is operated under the operating system, so as to start up as a computer for editing.

In connection, when the application software is operated, the graphic display for the graphical user interface (GUI) is displayed on the display 2B. If a desired graphic display displayed on the display 2B is selected by using the pen tablet 2E or the mouse 2D described above, the desired edit command can be input to the work station 2. Various numeral data relating to edit can also be input to the work station 2 through the key board 2C.

In addition, when the edit command or various numeral data is input by an operator, the work station 2 outputs control data in accordance with the edit command or various numeral data to a device controller 3 described later. In this way, respective devices composing the editing system 1 are controlled through the device controller 3. However, a part of the function of a video disk recorder 5 is directly controlled without the device controller 3.

Further, video data is input to the work station 2 through the device controller 3, so that the image of edit material or the image after edit can be displayed on the display 2B.

The device controller 3 is a control device for receiving the control data from the work station 2 and actually controlling respective devices. The exclusive controller 4 having dial operation keys or slide operation keys is connected to the device controller 3, so that the gradually-changing control data which can not be input from the key board 2C, the mouse 2D, or the pen tablet 2E of the work station 2 can be also input in the editing system 1.

The device controller 3 receives the control data from the work station 2 or the exclusive controller 4 to control the devices corresponding to the control data. For example, the device controller 3 instructs the video disk recorder 5 to reproduce a material and record the material after edit. The video disk recorder 5 instructed reproduces the video data or audio data of the desired material which has been stored in the internal disc recording medium to output it, and records the edited video data or audio data in the disc recording medium, in accordance with the instruction.

Similarly, the device controller 3 instructs the video tape recorder (VTR) 6 to reproduce a material. The instructed video tape recorder 6 reproduces the video data or audio data of the desired material which has been stored in the internal video tape to output it, in accordance with the instruction. In addition, in the editing system 1, the video data recorded in the video tape recorder 6 is manipulated as video data of the material, after being down-loaded once in the video disk recorder 5.

Further, the device controller 3 instructs the switcher 7 to select the video data output from the video tape recorder 6 or a video camera 8. The instructed switcher 7 selects the input video data of the desired material to output it to a digital multi-effector 9 and to output to the work station 2 through the device controller 3, successively selects the input video data of the desired video data to combine them, or outputs the edited video data to display it on a monitor 10, and returns the edited video data to the video disk recorder 5 to record it, in accordance with the instruction.

Further, the device controller 3 instructs the digital multi-effector 9 to perform various effect processing. The instructed digital multi-effector 9 performs on the input video data of the desired material the special effect processing such as the mosaic processing and the three-dimensional transform processing, effect processing such as the transition effect, and the image composite processing. The obtained video data is returned to the switcher 7 again and is output to the work station 2, the monitor 10, and the video disk recorder 5, in accordance with the instruction.

Further, the device controller 3 instructs an audio mixer 11 to edit the audio data output from the video disk recorder 5 or the video tape recorder 6. The instructed audio mixer 11 composes (mixes) the desired audio material, and returns the composed audio data to the video disk recorder 5 to be recorded, in accordance with the instruction.

In this way, in the editing system 1 having the construction described above, the desired edit command is input through the work station 2, so that the complicated and high-degree of desired video data can be produced easily by using the video data of a plurality of various materials which have been recorded in the video disk recorder 5 or the video tape recorder 6. Thus, if an operator does not directly operate respective devices consisting the editing system, the various edits can be performed by only operating the work station 2. Therefore, the works of edit can be reduced comparing to the conventional system, and the usage of the editing system can be improved.

(2) The Construction of the Work Station

Figure 2:
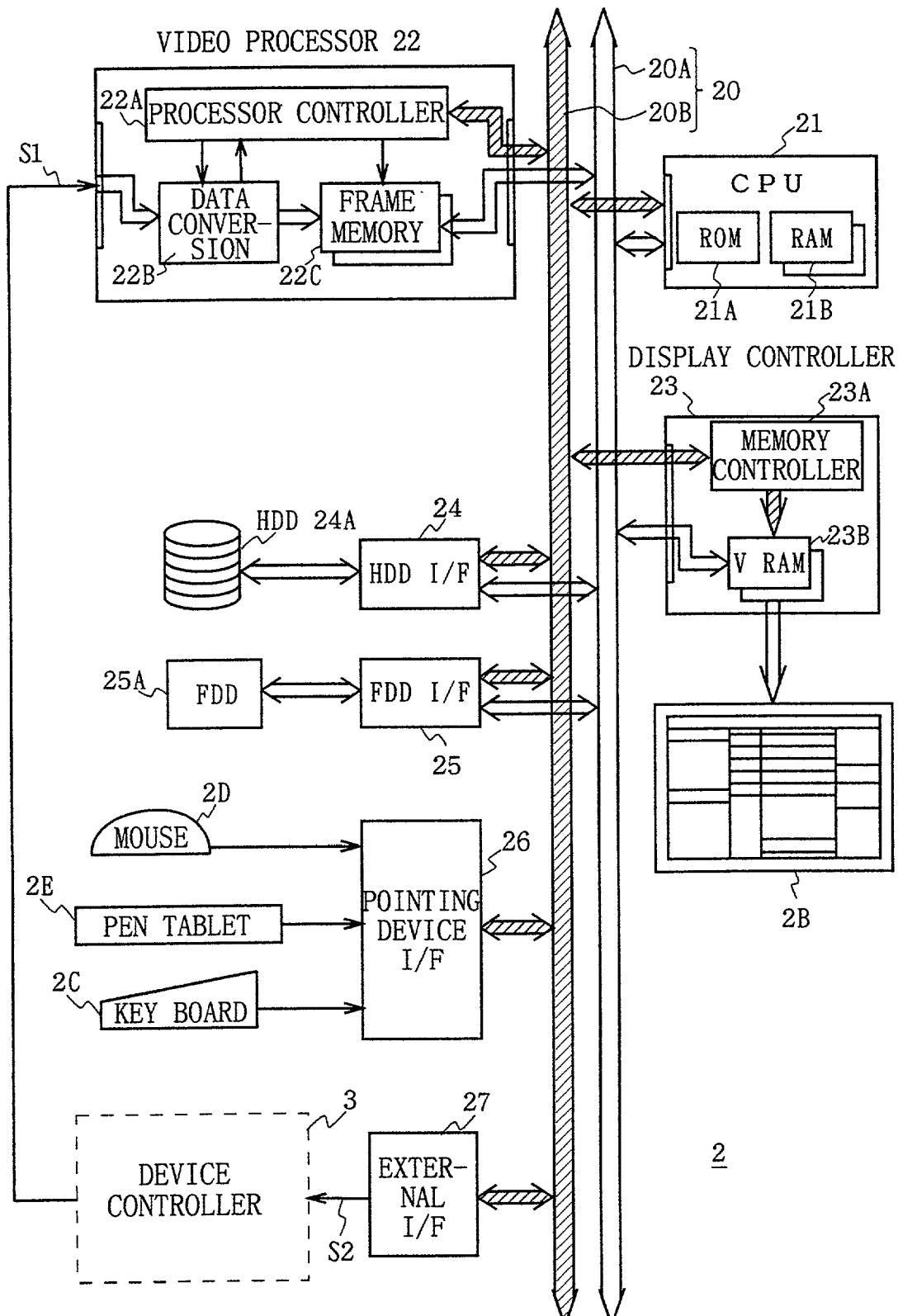
FIG. 2 is a block diagram showing the internal construction of the work station being the main construction of the editing system.

In this paragraph, the construction of the work station 2 which is the central existence of the editing system 1 will be described. As shown in FIG. 2, the work station 2 has a system bus 20 for transmitting the command data and the video data, a CPU 21 for controlling the work station 2 entirely, a video processor 22 for performing image processing on the video data S1 supplied from the device controller 3, a display controller 23 for managing the video data displayed on the display 2B and the graphic display for the GUI, an HDD interface 24 for controlling a local hard disk drive (local HDD) 24A, a FDD interface 25 for controlling a floppy disc drive (FDD) 25A, a pointing device interface 26 for producing the control command based on the command input from the pointing device such as the key board 2C, the mouse 2D, and the pen tablet 2E, and an external interface 27 having the software driver for outputting the control data S2 to the device controller 3.

The system bus 20 is a bus to transmit the video data, command data, address data, etc. in the work station 2, and is composed of an image data bus 20A for transmitting the video data and a command data bus 20B for transmitting the command data and the address data.

The CPU 21, the video processor 22, the display controller 23, the HDD interface 24, and the FDD interface 25 are connected to the image data bus 20A. The CPU 21, the video processor 22, the display controller 23, the HDD interface 24, and the FDD interface 25 transmit the video data through the image data bus 20A.

On the other hand, the CPU 21, the video processor 22, the display controller 23, the HDD interface 24, the FDD interface 25, the pointing device interface 26, and the external interface 27 are connected to the command data bus 20B (that is, all blocks in the work station 2 are connected). The command data and the address data are transmitted through the command data bus 20B.

The CPU 21 is a block for controlling the work station 2 entirely, and has a ROM 21A in which the operating system of the work station 2 is stored and a RAM 21B in which the uploaded application software and database are stored. To start up the work station 2, the CPU 21 operates based on the operating system stored in the ROM 21A so as to start up it. To drive the application software under the operating system started up, the CPU 21 firstly reads the application software recorded in the hard disk of the hard disk drive 24A to up-load it on the RAM 21B, thereafter, the application software is executed to be driven.

In addition, the application software is divided into modules according to their function. As described later, when roughly divided, the application software is composed of the edit module for combining the materials, the composite module for composing the materials such like superimposing, the special effect module for applying special effects to the materials such like the three-dimensional transform, and the control module for controlling the starting up of the modules and the data transfer. More specifically, in the system, when the application software is started up, firstly the control module is started up. Then, when the instruction is input from an operator to edit, the corresponding module is suitably started up under the control of the control module, so as to perform the edit instructed by the operator.

The video processor 22 is a block for receiving the video data S1 of the Serial Digital Interface (SDI) standard input to the work station 2 and converting the video data S1, which is buffered temporarily therein. More specifically, the video processor 22 is composed of a processor controller 22A for controlling the video processor entirely, a data converting part 22B for extracting the composite video signal from the pay load part of the received video data S1 and for converting the composite video signal into the digital component video data, and a frame memory 22C for storing the video data of several frames output from the data converting part 22B temporarily.

The processor controller 22A outputs the control signal to the data converting part 22B to control the data converting operation of the data converting part 22B, and makes the data converting part 22B to extract time code from the video data S1. Further, the processor controller 22A outputs the control signal to the frame memory 22C to control the read/write timing and the read/write address of the frame memory 22C. In connection, as to the read timing, the processor controller 22A controls the read timing of the frame memory 22C so that the time code output to the display controller 23 corresponds to the video data (frame data).

The data converting part 22B converts the composite video signal into the digital component video data based on the control signal from the processor controller 22A. In connection, the time code is extracted in this converting process. The obtained video data is output to the frame memory 22C as described above, and the extracted time code is output to the processor controller 22A.

The frame memory 22C stores the video data supplied from the data converting part 22B temporarily. The read/write timing of the frame memory 22C is controlled by the processor controller 22A as described above. The frame memory 22C is composed of at least two frames, and can store the video data for at least two frames.

The video data stored in the frame memory 22C is read out based on the read control of the processor controller 22A. The all pixels of the video data stored in the frame memory 22C is not read out, but the data is thinned out for each predetermined interval and read out so that the size of image is smaller than that of the original image. The converted video data having smaller size of image is output to the display controller 23 through the image data bus 20A, in order to be displayed at the predetermined display area of the display 2B as an image for confirmation of the materials or edited result.

The display controller 23 is a block for controlling the data to be displayed on the display 2B. The display controller 23 has a memory controller 23A and a video random access memory (VRAM) 23B. The memory controller 23A controls the read/write timing of the VRAM 23B in accordance with the internal synchronization of the work station 2. In the VRAM 23, the video data output from the frame memory 22C of the video processor 22 and the image data produced by the CPU 21 are stored based on the timing control signal from the memory controller 23A. The video data and image data stored in the VRAM 23B are read out based on the timing control signal from the memory controller 23A in accordance with the internal synchronization of the work station 2, to be displayed on the display 2B.

At this time, the graphic display of the image data becomes to the graphic display for the GUI. In connection, the image data output from the CPU 21 to the VRAM 23B is the image data such as windows, cursor, scroll bars, and icons showing devices.

Thus, in the work station 2, the image data and the video data are displayed on the display 2B, so that the GUI for the operator and the image of materials or edited result are displayed on the display 2B.

The HDD interface 24 is an interface block for communicating with the local hard disk drive 24A internally provided in the work station 2. The HDD interface 24 and the hard disk drive 24A communicate each other based on the transmission format of the Small Computer System Interface (SCSI).

The application software which is driven in the work station 2 is installed in the hard disk drive 24A. To execute the application software, it is read out from the hard disk drive 24A to be up-loaded to the RAM 21B. When the application software is terminated, various information produced by the edit operation stored in the RAM 21B is down-loaded to the hard disk via the hard disk drive 24A.

The FDD interface 25 is an interface block for communicating with the floppy disc drive 25A internally provided in the work station 2. The FDD interface 25 and the floppy disc drive 25A communicate each other based on the transmission format of the SCSI.

The pointing device interface 26 is an interface block for receiving the information from the key board 2C, mouse 2D, and pen tablet 2E which are connected to the work station 2. The pointing device interface 26 receives the input information from the buttons provided on the key board 2C to decode the received input information, and outputs it to the CPU 21. Similarly, the pointing device interface 26 receives the detection information of a two-dimensional rotary encoder provided in the mouse 2D and the click information of the left/right buttons provided on the mouse 2D (that is, the information selected and specified by pushing down the buttons) to decode the received information, and outputs it to the CPU 21. Similarly, the pointing device interface 26 receives the two-dimensional positional data from the pen tablet 2E to decode the received positional data, and outputs it to the CPU 21. Based on these information output from the pointing device interface 26, the CPU 21 can understand which command button is instructed among the GUI displayed on the display 2B, and understand various data input from the key board 2C, so as to perform the corresponding control.

The external interface 27 is a block for communicating with the device controller 3 connected to the work station 2 externally. The external interface 27 has a driver for converting various control command such as reproduction command produced by the CPU 21 and recording command into the data of a predetermined communication protocol, which outputs the control command data S2 to the device controller 3 through the driver.

(3) The Principle of Edit in the Editing System

In this paragraph, the principle of edit in the editing system 1 will be explained successively.

(3-1) Basic Construction of the Application Software for Edit

Figure 3:
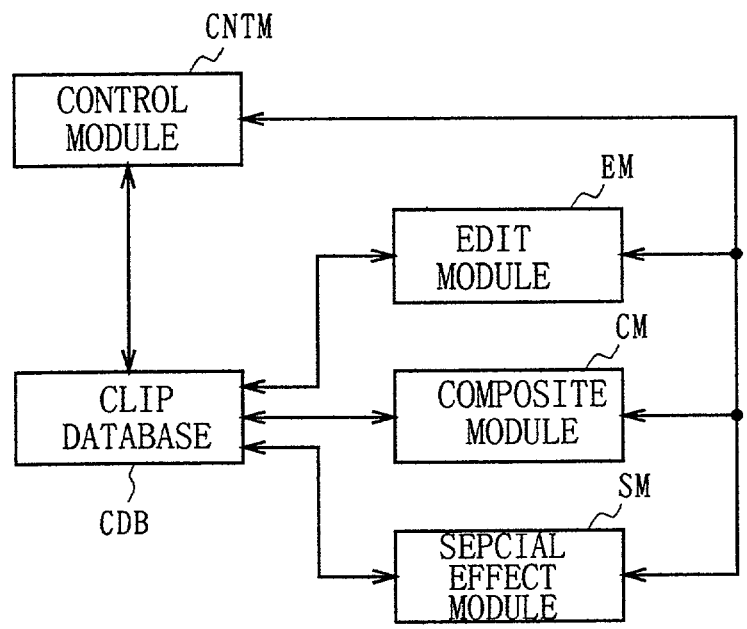
FIG. 3 is a schematic diagram showing modules and clip database provided in the editing system according to the present invention.

In this paragraph, the basic construction of the application software for edit prepared in the work station 2 will be firstly explained. As shown in FIG. 3, in the editing system 1, the application software for edit, which is divided into modules according to their function, is prepared in the work station 2. When roughly divided, the application software divided into modules is composed of the edit module EM for editing a material such like combining, the composite module CM for composing a material such like superimposing, the special effect module SM for applying special effects to a material, and the control module CNTM for controlling the starting up of the edit module EM, the composite module CM, and the special effect module SM which are divided into modules according to their functions. When the application software having such construction is up-loaded from the hard disk drive 24A to the RAM 21b, firstly the control module CNTM is started up. Then, each of the modules EM, CM, and SM is suitably started up under the control of the control module CNTM in accordance with the instruction from an operator.

A clip database CDB is composed of the video disk recorder 5 and the RAM 21B, and stores the video data of materials and various data relating to the edit. Each of the modules EM, CM, and SM reads out the material instructed by the operator from the clip database CDB, edits the material in accordance with the instruction of the operator using the hardware such as the switcher 7 or the digital multi-effector 9 described above, and registers the obtained material edited in the clip database CDB. Each of the modules EM, CM, and SM also registers the data relating to edit such as various parameters used for edit in the clip database CDB. In addition, the clip database CDB mainly stores the video data of the material in the video disk recorder 5, and stores various data relating to edit in the RAM 21B.

(3-2) Definition of Clip

In the editing system 1, each material is handled with a unit called clip. In this paragraph, the clip will be described. In the editing system 1 according to this invention, one sequence of the video moving image data is defined as clip video data. Data for managing information that how the clip video data is produced is defined as clip management data. Data consisting the clip video data and the clip management data is defined as clip. Further, in the editing system 1 according to this invention, a material produced by only cutting out from the source video data is called material clip (MC), and a material produced by editing the material clip is called resultant clip (FC).

In the editing system 1 according to this invention, a plurality of clips composed of the material clips and the resultant clips are managed with the hierarchical structure based on the relation between clips. Referring to an example of FIG. 4, the state will be explained below.

Figure 4:
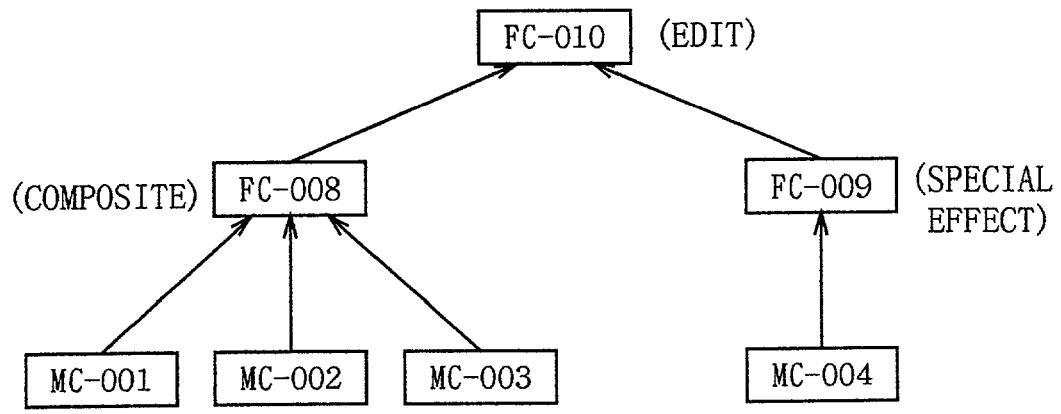
FIG. 4 is a schematic diagram explaining the hierarchical management of clips.

In the example of FIG. 4, the resultant clip FC-008 is a clip produced by composing three material clips, the material clip MC-001, the material clip MC-002, and the material clip MC-003. That is, the relations between the resultant clip FC-008 and the material clip MC-001, the material clip MC-002, and the material clip MC-003 are in the relation of up and low. In the relation of up and low, since the material clip MC-001, the material clip MC-002, and the material clip MC-003 are under the resultant clip FC-008, they are called lower clips. On the contrary, the resultant clip FC-008 is called upper clip because it is produced by composing these lower clips.

Similarly, the resultant clip FC-009 is a clip produced by applying the special effect to the material clip MC-004. Therefore, the material clip MC-004 is the lower clip of the resultant clip FC-009. On the contrary, the resultant clip FC-009 is the upper clip of the material clip MC-004.

Further, the resultant clip FC-010 is a resultant clip produced by editing (in this case, combining by wipe, etc.) the resultant clip FC-008 and the resultant clip FC-009. Therefore, the resultant clip FC-008 and the resultant clip FC-009 are respectively the lower clips of the resultant clip FC-010. The resultant clip FC-010 is the upper clip of the resultant clip FC-008 and the resultant clip FC-009.

In this way, the relation of up and low exists between respective clips. In the editing system 1, each clip is managed with the hierarchical structure based on the relation of up and low between clips in the clip database CDB. In connection, the material clip which is not used for edit have no relation with the other clips. However, the material clip is managed as a clip having no object to link. The example described here is one example and other combinations also exist as the relation of up and low between clips.

(3-3) General Idea of the Composite Processing

Figure 5:
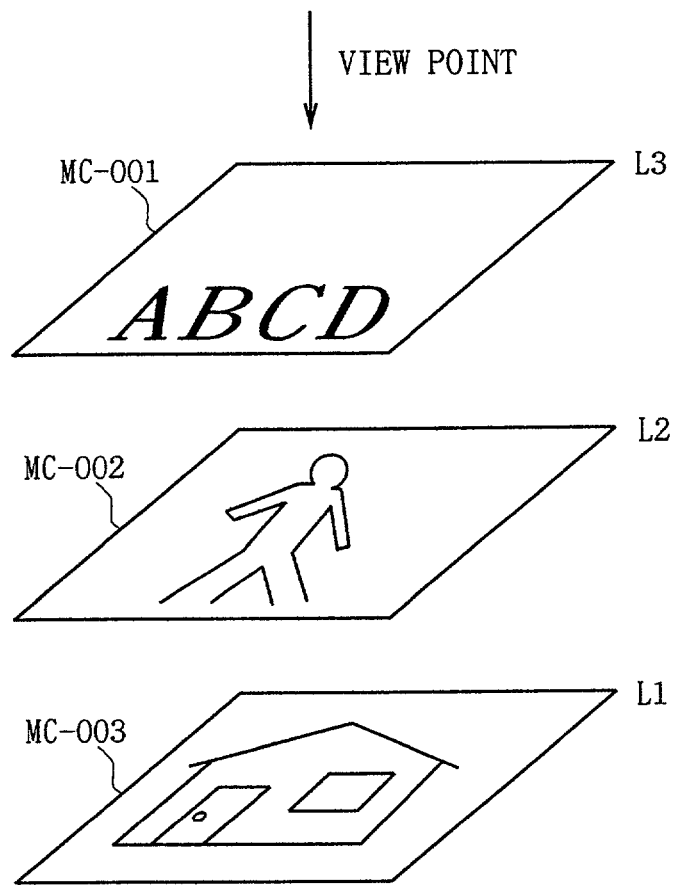
FIG. 5 is a schematic diagram explaining the image of composite processing.
Figure 6:
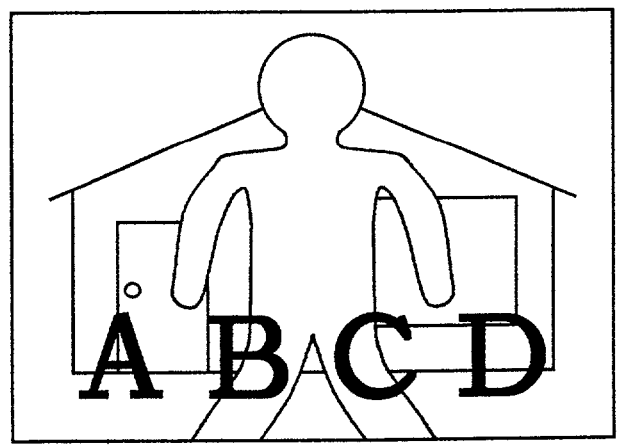
FIG. 6 is a screen image explaining the video image produced by the composite processing.

Next, in this paragraph, the general idea of the composite processing performed in the composite module CM will be explained. The video image of the resultant clip FC-008 shown in FIG. 4 is produced by composing (that is the composite processing) the video images of the material clip MC-001, the material clip MC-002, and the material clip MC-003. The general idea of the composite processing is shown in FIG. 5 and FIG. 6. FIG. 5 shows the state of composing the video images of three material clips MC-001, MC-002, and MC-003. FIG. 6 shows the video image of the resultant clip FC-008 produced by composing.

In the editing system 1 according to this invention, in the case of composing a plurality of clips, each clip is regarded as one layer, and the layers are piled up so as to compose. In the example of FIG. 5, the material clip MC-003 is specified as the first layer L1, the material clip MC-002 is specified as the second layer L2, and the material clip MC-001 is specified as the third layer L3. In the case of composing the material clips assigned to respective layers L1, L2, and L3, the layer L1 is the lowest layer, and respective layers L2, L3 are successively piled up thereon. More specifically, the video image of the material clip MC-002 (e.g., image showing a human) specified as the second layer L2 is piled on the video image of the material clip MC-003 (e.g., image showing background) specified as the first layer L1 to compose them, and the video image of the material clip MC-001 (e.g., image showing characters) specified as the third layer L3 is further piled up on the composed video image so as to compose them. By this composite processing, the resultant clip FC-008 of the video image such that three materials are superimposed as shown in FIG. 6 can be produced.

In addition, FIG. 5 shows the example of composing the material clips MC-003, MC-002, and MC-001 respectively assigned to three layer L1, L2, and L3. However, the editing system 1 of this invention can save ten layers at maximum, and can compose ten material clips respectively assigned from the first layer L1 to tenth layer L10. In connection, in this case, the first layer L1 is the lowest layer, and the tenth layer having the largest layer number is the uppermost layer.

Figure 7:
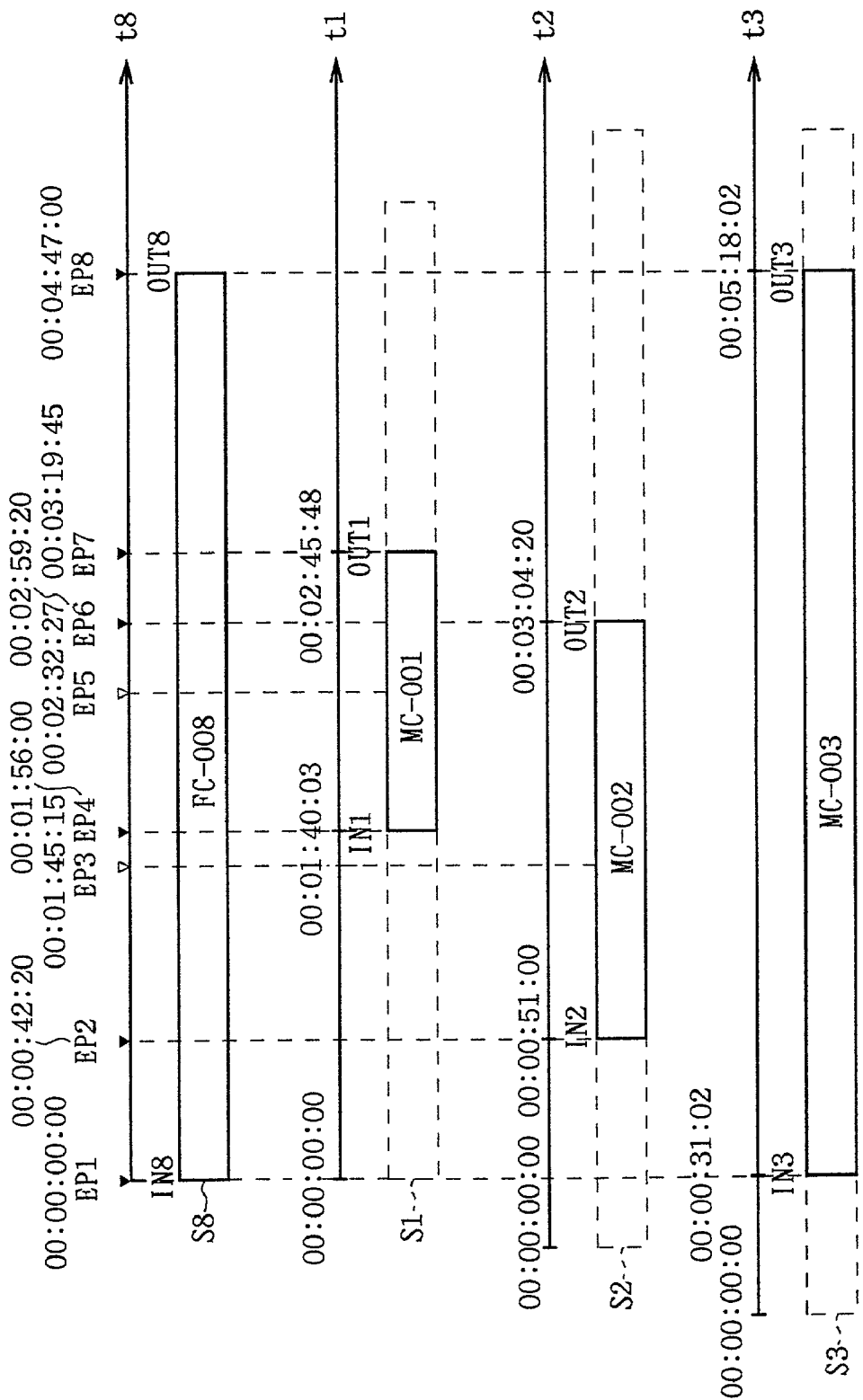
FIG. 7 is a schematic diagram explaining the concept of the composite processing.

Next, referring to FIG. 7, the composite processing will be further explained with more details. FIG. 7 shows the state that the resultant clip FC-008 is produced by composing the material clip MC-003 specified as the first layer L1, the material clip MC-002 specified as the second layer L2, and the material clip MC-001 specified as the third layer L3. As shown in FIG. 7, in the resultant clip FC-008, the first editing point EP1 to the eighth editing point EPB are set as an edit start point of each material clip (which is referred to as in-point), an edit end point (which is referred to as out-point), and points for changing parameters of the composition and the image conversion.

The first editing point EP1 indicates the in-point IN3 of the material clip MC-003, the second editing point EP2 indicates the in-point IN2 of the material clip MC-002, the fourth editing point EP4 indicates the in-point IN1 of the material clip MC-001. Further, the sixth editing point EP6 indicates the out-point OUT2 of the material clip MC-002, the seventh editing point EP7 indicates the out-point OUT1 of the material clip MC-001, and the eighth editing point EP8 indicates the out-point OUT3 of the material clip MC-003. In addition, the third editing point EP3 and the fifth editing point EP5 are the editing points set for changing the composite parameter of each layer. The editing points EP3 and EP5 will be described in details later.

As shown in FIG. 7, each clip has the original internal time code starting from the head position of the video data of each clip. For example, the material clip MC-003 specified as the first layer L1 has the internal time line t3 starting from the head position S3 of the video data, the material clip MC-002 specified as the second layer L2 has the internal time line t2 starting from the head position S2 of the video data, and the material clip MC-001 specified as the third layer L3 has the internal time line t1 starting from the head position S1 of the video data.

Similarly, the resultant clip FC-008 has the internal time line t8 starting from the head position S8 of the video data. The time codes of the first editing point EP1 to the eighth editing point EP8 are respectively defined by the time codes on the time lines t8 of the resultant clip FC-008.

The in-point IN3 and out-point OUT3 of the material clip MC-003 are defined by the time line t3 of the material clip MC-003, and their time codes are "00:00:31:02" and "00:05:18:02" respectively. Accordingly, the time code of the in-point IN3 corresponds to the time code "00:00:00:00" of the first editing point EP1 in the resultant clip FC-008, and the time code of the out-point OUT3 corresponds to the time code "00:04:47:00" of the eighth editing point EP8 in the resultant clip FC-008.

Similarly, The in-point IN2 and out-point OUT2 of the material clip MC-002 are defined by the time line t2 of the material clip MC-002, and their time codes are "00:00:51:00" and "00:03:04:20" respectively. Accordingly, the time code of the in-point IN2 corresponds to the time code "00:00:42:20" of the second editing point EP2 in the resultant clip FC-008, and the time code of the out-point OUT2 corresponds to the time code "00:02:59:20" of the sixth editing point EP6 in the resultant clip FC-008.

Similarly, The in-point IN1 and out-point OUT1 of the material clip MC-001 are defined by the time line t1 of the material clip MC-001, and their time codes are "00:01:40:03" and "00:02:45:48" respectively. Accordingly, the time code of the in-point IN1 corresponds to the time code "00:01:56:00" of the fourth editing point EP4 in the resultant clip FC-008, and the time code of the out-point OUT1 corresponds to the time code "00:03:19:45" of the seventh editing point EP7 in the resultant clip FC-008.

Therefore, when the resultant clip FC-008 is reproduced, the video image of the material clip MC-003 is output during the period from the first editing point EP1 to the second editing point EP2. The video image of which the material clip MC-002 is composed on the material clip MC-003 is output during the period from the second editing point EP2 to the fourth editing point EP4. The video image of which the material clip MC-002 and the material clip MC-001 are composed on the material clip MC-003 is output during the period from the fourth editing point EP4 to the sixth editing point EP6. The video image of which the material clip MC-001 is composed on the material clip MC-003 is output during the period from the sixth editing point EP6 to the seventh editing point EP7. Then, the video image of the material clip MC-003 is output during the period from the seventh editing point EP7 to the eighth editing point EP8.

In addition, the example described here is one example and other combinations also exist as a combination of clips to be composed.

(3-4) General Idea of the Special Effect Processing

Next, in this paragraph, the general idea of the special effect processing which is performed in the special effect module SM will be explained. The resultant clip FC-009 shown in FIG. 4 is a clip produced by applying the special effect to the material clip MC-004. In order to make it easy to understand, four special effects, the mosaic effect, the crop effect, the three-dimensional transform, and the trail effect are applied to the material clip MC-004, and the general idea of the special effect processing is explained referring to FIG. 8.

Figure 8:
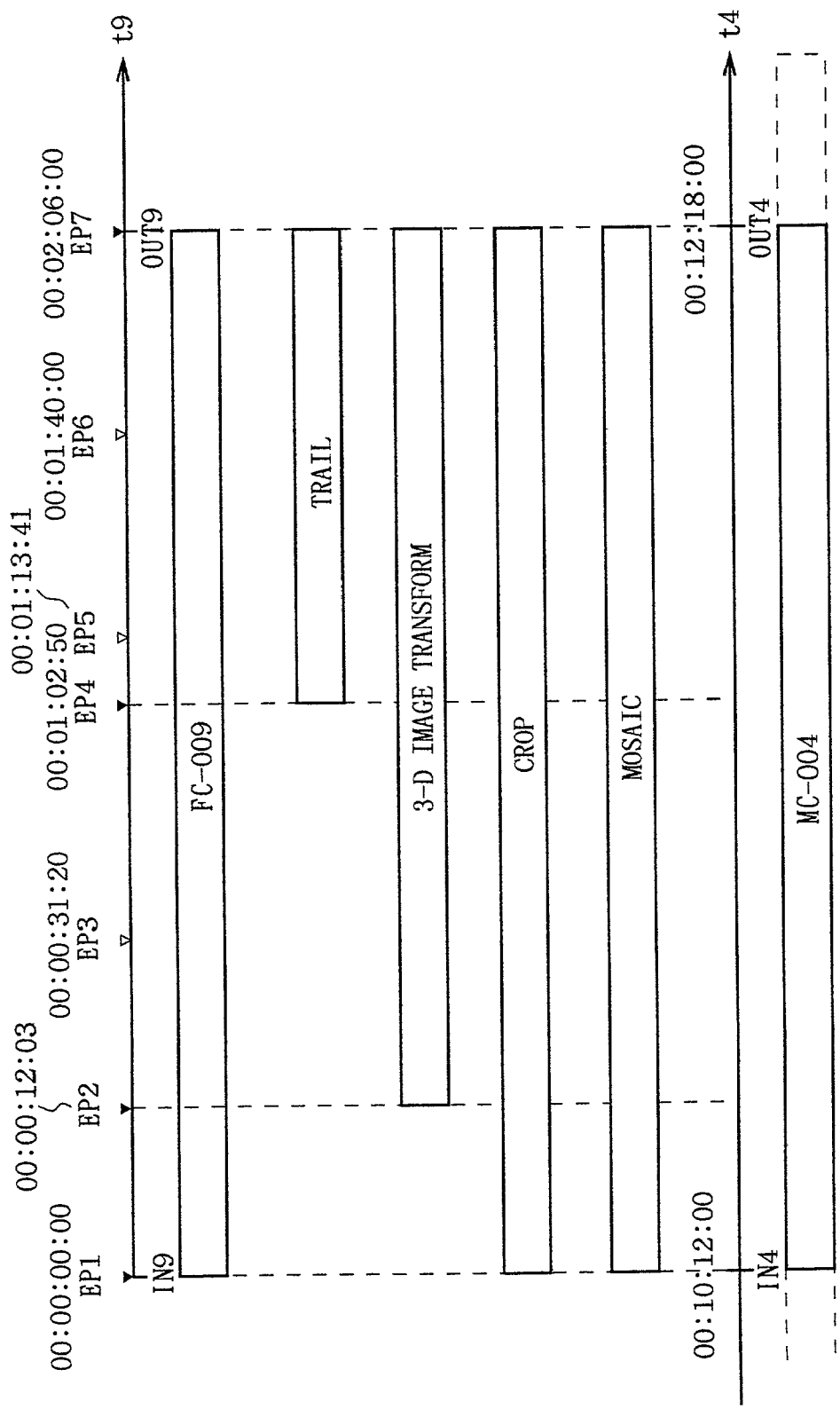
FIG. 8 is a schematic diagram explaining the concept of the special effect processing.

As show in FIG. 8, in this example, to the material clip MC-004, the mosaic effect is specified as the first special effect E1, the crop effect is specified as the second special effect E2, the three-dimensional transform is specified as the third special effect E3, and the trail effect is specified as the fourth special effect.

In this case, the mosaic effect is the effect that the video image is divided into tile pieces to show it like a mosaic picture. In the editing system 1 according to this invention, parameters relating to the mosaic effect can be set to arbitrary values, so that the size of a tile piece and the aspect ratio can be set to arbitrary values.

The crop effect is the effect that a part of the video image is cut out by reducing the picture frame, which is called the cut-out effect because a part of the video image is cut out. In the editing system 1 according to this invention, parameters relating to the crop effect can be set to arbitrary values, so that the position of the right and left side of the picture frame, the position of the top and bottom side of the picture frame, and the gradation of the edges can be set to arbitrary values.

The three-dimensional transform is the effect that an image is virtually transformed on the three-dimensional space. For example, it is the image transform for rotating the image using the X-axis, Y-axis, and Z-axis as a shaft, and for transferring the image into the X-axis, Y-axis, or Z-axis direction, when the horizontal direction of the image is defined as X-axis, the vertical direction is defined as Y-axis, and the depth direction is defined as Z-axis. In the editing system 1 according to this invention, parameters relating to the three-dimensional transform can be set to arbitrary values, so that the image can be transformed arbitrarily.

The trail effect is the effect that when the image is transferred spatially, the image is frozen as a still image for a predetermined period, and the frozen image is left as an afterimage. Generally, it is called recursive effect. In the editing system 1 according to this invention, parameters relating to the trail effect can be set to arbitrary values, so that the period for freezing the image and the period for leaving the image as an afterimage can be set arbitrarily.

Also in the special effect processing, as shown in FIG. 8, in the resultant clip FC-009, the first editing point EP1 to the seventh editing point EP7 are set as an edit start point (in-point), an edit end point (out-point), and the parameter changing point of the image transform.

The first editing point EP1 indicates the in-point IN4 of the material clip MC-004, the start point of the mosaic effect, and the start point of the crop effect. The second editing point EP2 indicates the start point of the three-dimensional transform. The fourth editing point EP4 indicates the start point of the trail effect. The seventh editing point EP7 indicates the out-point OUT4 of the material clip MC-004, the end point of the mosaic effect, the end point of the crop effect, the end point of the three-dimensional transform, and the end point of the trail effect. In addition, the third editing point EP3, the fifth editing point EP5, and the sixth editing point EP6 are editing points set to change parameters of the three-dimensional transform. These editing points EP3, EP5 and EP6 will be described later.

In the case of special effect, similar to the composite processing, the material clip MC-004 and the resultant clip FC-009 respectively have the internal time lines t4, t9 expressed by the original internal time codes starting from the head position of the video data of respective clips. The time codes of the first editing point EP1 to the seventh editing point EP7 described above are defined by the time codes on the time line t9 of the resultant clip FC-009.

The in-point IN4 and the out-point OUT4 of the material clip MC-004 are respectively defined by the time line t4 of the material clip MC-004. Their time codes are "00:10:12:00" and "00:12:18:00" respectively. Accordingly, the time code of the in-point IN4 corresponds to the time code "00:00:00:00" of the first editing point EP1 in the resultant clip FC-009, and the time code of the out-point OUT4 corresponds to the time code "00:02:06:00" of the seventh editing point EP7 in the resultant clip FC-009.

Further, as shown in FIG. 8, the start point of the mosaic effect specified as the first special effect E1 is the first editing point EP1 that the time code in the resultant clip FC-009 is "00:00:00:00". The end point of the mosaic effect is the seventh editing point EP7 that the time code in the resultant clip FC-009 is "00:02:06:00".

Similarly, as shown in FIG. 8, the start point of the crop effect specified as the second special effect E2 is the first editing point EP1 that the time code in the resultant clip FC-009 is "00:00:00:00". The end point of the crop effect is the seventh editing point EP7 that the time code in the resultant clip FC-009 is "00:02:06:00".

Also, the start point of the three-dimensional transform specified as the third special effect E3 is the second editing point EP2 that the time code in the resultant clip FC-009 is "00:00:12:03". The end point of the three-dimensional transform is the seventh editing point EP7 that the time code in the resultant clip FC-009 is "00:02:06:00".

Also, the start point of the trail effect specified as the fourth special effect E4 is the fourth editing point EP4 that the time code in the resultant clip FC-009 is "00:01:02:50". The end point of the trail effect is the seventh editing point EP7 that the time code in the resultant clip FC-009 is "00:02:06:00".

Therefore, when the resultant clip FC-009 is reproduced, the video image of which the mosaic effect and the crop effect are applied to the video image of the material clip MC-004 is output during the period from the first editing point EP1 to the second editing point EP2. The video image of which the mosaic effect, the crop effect, and the three-dimensional transform are applied to the video image of the material clip MC-004 is output during the period from the second editing point EP2 to the fourth editing point EP4. The video image of which the mosaic effect, the crop effect, the three-dimensional transform, and the trail effect are applied to the video image of the material clip MC-004 is output during the period from the fourth editing point EP4 to the seventh editing point EP7.

(3-5) General Idea of the Edit Processing

In this paragraph, the general idea of the edit processing performed in the edit module EM will be explained. The resultant clip FC-010 shown in FIG. 4 is a clip produced by editing the resultant clip FC-008 and the resultant clip FC-009. In order to make it easy to understand, supposing that the edit processing is performed with the wipe effect, the general idea of the edit processing is explained referring to FIG. 9.

Figure 9:
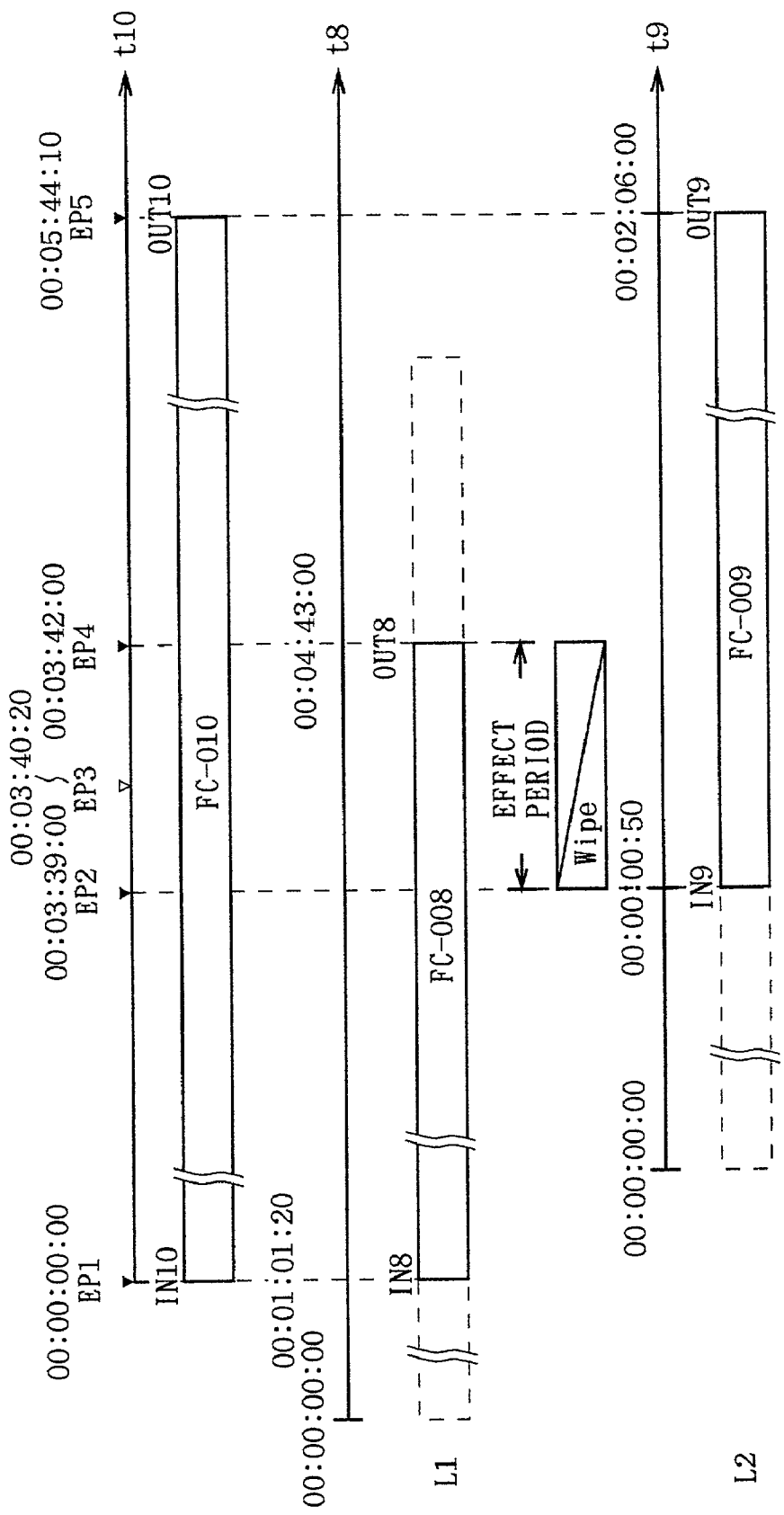
FIG. 9 is a schematic diagram explaining the concept of the edit processing.

As shown in FIG. 9, in this example, the resultant clip FC-008 is specified as the first layer L1 and the resultant clip FC-009 is specified as the second layer L2. The wipe effect is specified as a processing of changing from the resultant clip FC-008 specified as the first layer L1 to the resultant clip FC-009 specified as the second layer L2. Note that in the edit processing, since the video data is not superimposed like a composite processing, but the video data are combined, the temporally earlier video data is specified as the first layer L1 and the temporally later video data is specified as the second layer L2.

Further, the wipe effect specified as the change processing is a transition effect for wiping an old picture displayed at present with a new picture to change the picture displayed on a screen. In connection, the wipe effect specified in the example shown in FIG. 9 is the wipe effect that the picture is changed from the left side of the picture to the right side when the image of the resultant clip FC-008 is changed into the image of the resultant clip FC-009.

Also, in this edit processing, as shown in FIG. 9, in the resultant clip FC-010, the first editing point EP1 to the fifth editing point EP5 are set as an edit start point (in-point) of each clip, an edit end point (out-point), and the parameter changing point of the edit.

The first editing point EP1 indicates the in-point IN8 of the resultant clip FC-008. The second editing point EP2 indicates the start point of the wipe effect and the in-point IN9 of the resultant clip FC-009. The fourth editing point EP4 indicates the end point of the wipe effect and the out-point OUT8 of the resultant clip FC-008. The fifth editing point EP5 indicates the out-point OUT9 of the resultant clip FC-009. Here, the third editing point EP3 is an editing point set for changing the effect parameters of the wipe effect. The editing point EP3 will be described in details later.

Similarly to the composite processing and the special effect processing described above, the resultant clips FC-008, FC-009, and FC-010 have the internal time lines t8, t9, and t10 expressed by the original internal time codes starting from the head position of the video data of respective clips. The first editing point EP1 to the fifth editing point EP5 described above are defined by the time codes on the time line t10 of the resultant clip FC-010.

The in-point IN8 and the out-point OUT8 of the resultant clip FC-008 are respectively defined by the time line t8 of the resultant clip FC-008, and the time codes are "00:01:01:20" and "00:04:43:00" respectively. Accordingly, the time code of the in-point IN8 corresponds to the time code "00:00:00:00" of the first editing point EP1 in the resultant clip FC-010, and the time code of the out-point OUT8 corresponds to the time code "00:03:42:00" of the fourth editing point EP4 in the resultant clip FC-010.

Similarly, the in-point IN9 and the out-point OUT9 of the resultant clip FC-009 are respectively defined by the time line t9 of the resultant clip FC-009, and their time codes are "00:00:00:50" and "00:02:06:00" respectively. Accordingly, the time code of the in-point IN9 corresponds to the time code "00:03:39:00" of the second editing point EP2 in the resultant clip FC-010, and the time code of the out-point OUT9 corresponds to the time code "00:05:44:10" of the fifth editing point EP5 in the resultant clip FC-010.

Further, the start point of the wipe effect set to change the image of the resultant clip FC-008 and the image of the resultant clip FC-009 is set to the second editing point EP2 in the resultant clip FC-010, and set to "00:03:39:00" as a time code. Also, the end point of the wipe effect is set to the fourth editing point EP4 in the resultant clip FC-010, and set to "00:03:42:00" as a time code.

Therefore, when the resultant clip FC-010 is reproduced, the video image of the resultant clip FC-008 is output during the period from the first editing point EP1 to the second editing point EP2. The image such that the video image of the resultant clip FC-008 is successively changed to the video image of the resultant clip FC-009 is output by the wipe effect, from the left side of the screen toward the right side, during the period from the second editing point EP2 to the fourth editing point EP4. The image of the resultant clip FC-009 is output during the fourth editing point EP4 to the fifth editing point EP5.

(4) Graphic Display Displayed as GUI

Next, in this paragraph, the screen of the GUI displayed on the display 2B of the work station 2 when each module is started up will be explained.

(4-1) GUI when the Composite Module is Started Up

First, in this paragraph, the GUT when the composite module CM is started up is explained. In the editing system 1, the graphic display shown in FIG. 10 is displayed as a GUI of the composite module CM on the display 2B of the work station 2, when the composite module CM is started up.

Figure 10:
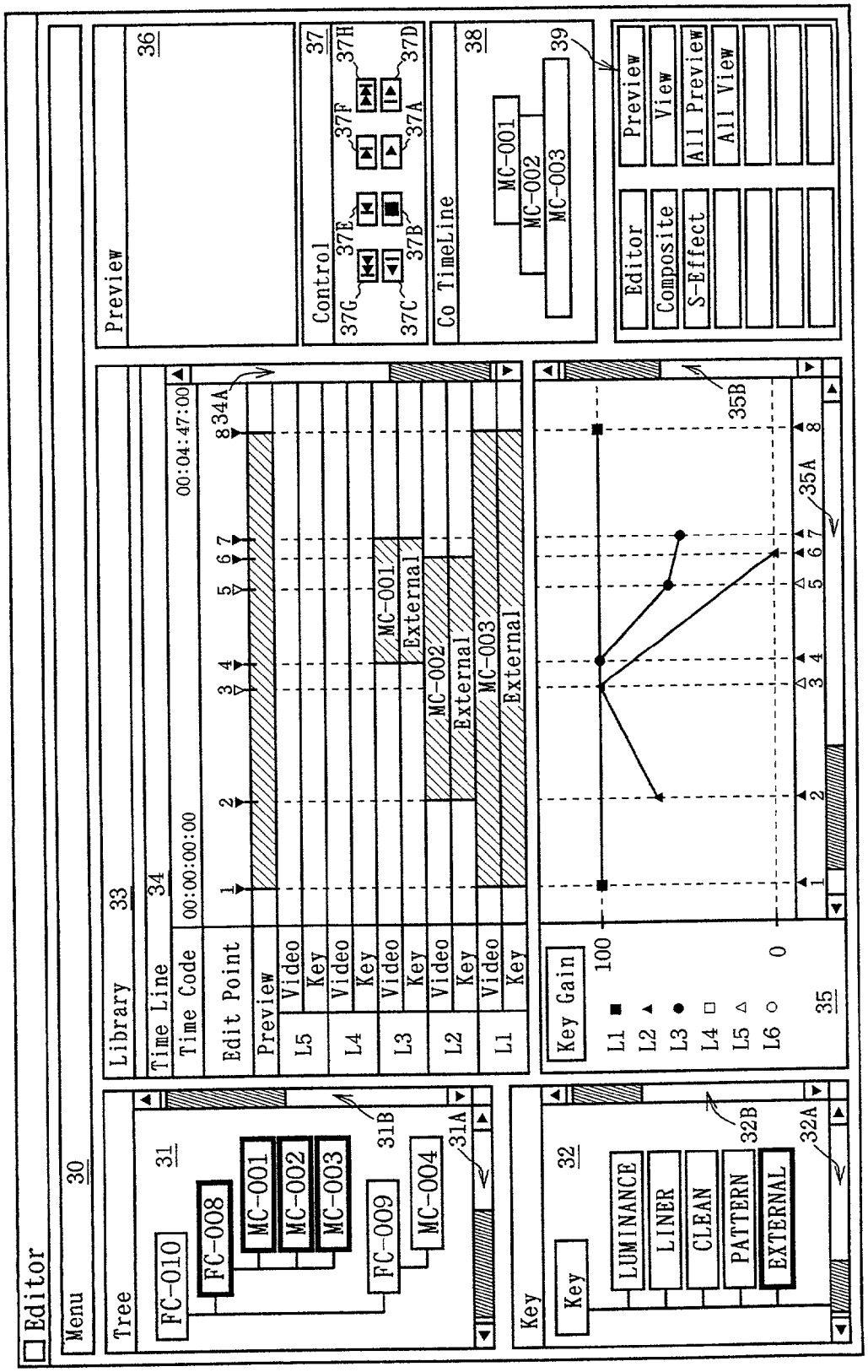
FIG. 10 is a screen image showing the GUI screen displayed when the composite module is started up.

As shown in FIG. 10, when roughly divided, the GUI of the composite module CM is composed of a menu window 30, a clip tree window 31, a key window 32, a library window 33, a time line window 34, a parameter setting window 35, a preview screen display window 36, a device control window 37, an edit content display window 38, and a control command window 39.

The menu window 30 is an area for displaying the top menu prepared in the editing system 1. In addition, the menu window 30 is displayed after the control module CNTM is started up.

In the editing system 1 according to this invention, for example, a file read menu, an initial setting menu, and a module start-up menu, etc. are prepared as the top menu. When the file read menu is specified by pushing down the button of the mouse 2D (hereinafter, the specification action using the mouse is referred to as click), the list of the resultant clips which have been already registered is displayed. A desired resultant clip is selected by click operation among from the list to read the edit content of the selected resultant clip onto the time line window 34 described later. Thus, if the resultant clip already registered is modified, the file read menu is used to read the resultant clip, and the resultant clip can be modified.

Further, when the initial setting menu is selected by click operation, various setting items are read out. A desired item is selected among from the various items to display a setting screen for the selected item is displayed. Thus, if a desired item is initially set, the setting screen of the item is read out from the initial setting menu, and the desired value for the item can be set.

Further, when the module start-up menu is selected by click operation, the commands for starting up the composite module CM, the special effect module SM, and the edit module EM are displayed. A desired command is selected among from them to start up the selected module and the GUI corresponding to the module is displayed on the screen. In fact, the GUI of the composite module CM shown in FIG. 10 is a screen obtained by starting up the composite module CM from the module start-up menu.

The clip tree window 31 is an area for displaying the graphic display to visually obtain the hierarchical relation of clips registered in the clip database. When the hierarchical relation of clips is that shown in FIG. 4, the clip tree shown in FIG. 10 is displayed in accordance with the hierarchical relation. More specifically, in this case, since the uppermost clip is the resultant clip FC-010, the clip name of the resultant clip FC-010 "FC-010" is displayed on the uppermost position of the clip tree window 31. As a result, lower clips being linked to the resultant clip FC-010 at a lower position are the resultant clip FC-008 and the resultant clip FC-009. The clip name of these lower clips "FC-008" and "FC-009" are displayed below the resultant clip FC-010 being an upper clip and displayed in parallel at the position shifting toward the right side by one stage. At this time, a line connecting the resultant clip FC-010 and the resultant clip FC-008 and a line connecting the resultant clip FC-010 and the resultant clip FC-009 are displayed, so as to show that the resultant clips FC-010, FC-008 and FC-009 have the hierarchical relation.

Further, lower clips being linked to the resultant clip FC-008 at a lower position are the material clip MC-001, the material clip MC-002, and the material clip MC-003. The clip names of the lower clips "MC-001", "MC-002", and "MC-003" are displayed below the resultant clip FC-008 being an upper clip and displayed in parallel at the position shifting toward the right side by more one stage. As this time, a line connecting the resultant clip FC-008 and the material clip MC-001, a line connecting the resultant clip FC-008 and the material clip MC-002, and a line connecting the resultant clip FC-008 and the material clip MC-003 are displayed, so as to show that the clips FC-008, MC-001, MC-002, and MC-003 have the hierarchical relation.

In the similar way, lower clips being linked to the resultant clip FC-009 at a lower position is the material clip MC-004. The clip name of the lower clip "MC-004" is displayed below the resultant clip FC-009 being an upper clip, and displayed at the position shifting toward the right side by one stage. As this time, a line connecting the resultant clip FC-009 and the material clip MC-004 is displayed, so as to show that the clips FC-009 and MC-004 have the hierarchical relation.

In this way, in the clip tree window 31, the clip names of clips are displayed like a tree, so as to immediately understand the relation between clips registered in a database visually.

In addition, the clip whose clip name is surrounded by a frame with a bold line is a clip being displayed at present to be edited. Moreover, a scroll button 31A of the left and right direction is displayed at the bottom position of the clip tree window 31. The scroll button 31A is operated by using the mouse 2D, so that the displayed clip tree can be scrolled in the right and left direction.

Similarly, a scroll button 31B of the up and down direction is displayed at the right side position of the clip tree window 31. The scroll button 31B is operated, so that the displayed clip tree can be scrolled in the up and down direction.

The key window 32 is an area for displaying key selection buttons to designate a key processing for the clip to be edited. A desired button is selected among from them to designate the desired key processing for the clip to be edited. At this time, as shown in FIG. 10, the key selection buttons such as a luminance key button, a liner key button, a clean key button, a pattern key button, and an external key button are prepared.

In this connection, the key processing is a processing of hollowing out the area based on the key signal from the video image and putting another image into there. Further, the luminance key is a key processing for performing a hollowing-out processing based on the luminance signal contained in the key signal. The liner key is a kind of the luminance key, which is a key processing that the changeable width of the gain becomes narrower than that of the luminance key. The clean key is a processing for putting the image to be put into without the hollowing-out in the key processing. Further, the pattern key is a key processing for cutting out based on the wipe pattern. The external key is a key processing for performing based on the key signal supplied from the external device.

Also in the key window 32, a scroll button 32A of the left and right direction is displayed at the bottom position of the key window 32. The scroll button 32A is operated so that the displayed key selection buttons can be scrolled in the right and left direction. Similarly, a scroll button 32B of the up and down direction is displayed at the right side position of the key window 32. The scroll button 32B is operated so that the displayed key selection buttons can be scrolled in the up and down direction.

The library window 33 is an area for displaying the list of the material clips or the resultant clips registered in the clip database. A desired clip is selected among from the clips displayed on the library window 33 to designate the selected clip as the clip to be edited. The library window 33 will be described in details later.

The time line window 34 is an area for placing the clips to be edited on the time axis to designate the content of edit. On the time line window 34 displayed at the composite module CM, the contents relating to the composite processing are displayed. The time line window 34 is divided into areas. When roughly divided successively from the top, a time code display area (Time Code), an editing point display area (Edit Point), a preview extent display area (Preview), and a clip specifying area (L1 to L10).

The time code display area is an area for displaying the time code at the editing point. The time code is a time code on the time line of the resultant clip produced based on the edit contents designated on the time line window 34.

The editing point display area is an area for indicating a point set as an editing point by a triangle mark. For example, when the composite processing shown in FIG. 4 and FIG. 7 is specified, the editing points EP1 to EP8 are indicated by using a triangle mark.

The preview extent display area is an area for indicating the extent of the video data displayed on the preview screen display window 36 when a preview button or a view button which is described later is operated. In this example, the section between the editing point EP1 and the editing point EP8 are set as the display extent, and a bar showing the section is displayed.

The clip specifying area is an area for specifying to each layer the clip to be edit to which the composite processing is applied. In the editing system 1, ten layers of the layer L1 to the layer L10 are prepared, and the clip being the material of the composite processing can be specified to each layer. In addition, since the display extent of the clip specifying area is limited (as shown in the figure, it is for about five layers), the layers L1 to L10 can not be displayed all together. However, the scroll button 34A displayed at the right side of the clip specifying area is operated so that the clip specifying area can be scrolled in the up and down direction. Therefore, a desired layer can be displayed.

Among ten layers L1 to L10, the layer L1 is a layer for specifying the clip being the base (lowermost) image at the time of composite processing. The layers L2 to L10 are layers for specifying the clips which are piled up on the base image. In addition, as the number of layer becomes larger, the hierarchy of layer becomes higher. Here, the layer L10 is the highest layer.

Each of the layers L1 to L10 is divided into a video area (Video) for specifying the clip to be composed and a key area (Key) for specifying the key processing performed on the specified clip. In this case, the rectangular graphic image (hereinafter, referred to as cell) indicating the clip is placed on the video area, so as to set the clip to the layer. Similarly, the cell indicating the key processing is placed on the key area, so as to set the key processing to the clip which is specified to the layer.

Here, as shown in FIG. 10, to set the material clip MC-003 to the layer L1, the material clip MC-003 is clicked on the clip tree window 31 or the material clip MC-003 is clicked on the library window 33, so as to select the material clip MC-003. Such processing is performed to display the cell of the material clip MC-003. The cell is transferred to the video area of the layer L1 and placed at a desired position, so that the material clip MC-003 is set to the layer L1.

Similarly, to set the external key to the layer L1, the external key button is clicked on the key window 32, so as to select the external key. Such processing is performed to display the cell indicating the external key. The cell is placed at the key area of the layer L1, so that the external key is set to the layer L1. In connection, the operation of setting the clip or key processing to the layers L2 to L10 is same as the operation of setting to the layer L1 described above.

In addition, the length of the cell indicating the clip corresponds to the duration (time period from the start to the end of clip) of the clip. The cell indicating the key processing makes a pair with the clip placed at the video area, and has the same length as the clip placed at the video area. The characters showing the clip name or key processing name is displayed on each cell, so as to understand at a glance which clip or key processing is set.

Also, when the resultant clip placed and displayed at the clip specifying area is selected by double-clicking, the module which has produced the resultant clip (that is, the composite module CM, the special effect module SM, or the edit module EM) is started up, and the content of edit performed on the resultant clip is displayed on the time line window of the GUI of the corresponding module.

The parameter setting window 35 is an area for setting various parameters relating to edit. On the parameter setting window 35 displayed at the time of starting-up the composite module CM, the content relating to the composite processing is displayed as a matter of course, and as shown in FIG. 10, the graphic display for setting the gain of the composite processing is displayed.

In this case, the gain of the composite processing is the composite ratio when the video data is piled up. More specifically, when the gain is 100%, the upper video data is piled up on the lower video data so that the lower video data is completely not viewed. For example, when the gain is 50%, the upper video data is piled up on the lower video data so that an approximately half of the lower video data is viewed transparently. When the gain is 0%, the upper video data is piled up so that it is not viewed and the lower video data is completely viewed transparently.

In addition, the horizontal axis (i.e., time axis) of the parameter setting window 35 corresponds to that of the time line window 34 described above, and the change point of the parameters can be determined with referring to the contents of the composite processing specified on the time line window 34. In connection, regarding to the horizontal direction, that is the left and right direction, the scroll button 35A placed at the bottom side of the parameter setting window 35 is operated so as to scroll the graphic image of the parameter setting window 35 in the direction of left and right. As this time, since the horizontal axis of the time line window 34 corresponds to that of the parameter setting window 35, the graphic image of the time line window 34 and the graphic image of the parameter setting window 35 are linked and scrolled in the direction of left and right at the same time. In addition, regarding to the up and down direction, the scroll button 35B placed at the right side of the parameter setting window 35 is operated so as to scroll the graphic image of the parameter setting window 35 in the direction of up and down.

Here, to set the gain of the clip specified to each layer, a desired layer number is first clicked among from the layer numbers displayed at the left corner of the parameter setting window 35 to specify the layer of which parameter is set next. Then, a point of which parameter is changed is decided and the gain value to be set is decided, with viewing the content of the composite processing specified on the time line window 34. The position corresponding to the decided point and value is clicked at the parameter setting window 35 consisting the vertical axis being the gain value and the horizontal axis being time. Thereby, the gain value and the gain changing point corresponding to the clicked position are registered automatically.

For example, as shown in FIG. 10, to set the gain of the material clip MC-003 specified to the layer L1 to 100%, if the positions where the gain is 100% are clicked at the positions of the in-point and the out-point of the material clip MC-003, the gain of the material clip MC-003 from the in-point to the out-point are all set to 100%. In the editing system 1, since the set values are interpolated between the parameter setting points so as to be successive values and the interpolated values are automatically set. If the same values are set at two parameter setting points in the above way, all values between two points are set to the same values.

Further, regarding the material clip MC-002 set to the layer L2, to set the case where the gain to 59% at the in-point (the editing point EP2), the gain to 100% at the position a little before the point where the material clip MC-003 is piled up (the editing point EP3), and the gain to 0% at the out-point (the editing point EP6), the corresponding points may be clicked respectively on the parameter setting window 35. Thus, the set gain values are automatically registered in the clip database. In addition, during the period between the editing point EP2 to the editing point EP3 and the period between the editing point EP3 to the editing point EP6, the gain values are interpolated so as to be linear and successive values based on the values set at respective editing points, and the interpolated values are automatically set.

Similarly, regarding the material clip MC-003 set to the layer L3, to set the case where the gain to 100% at the in-point (the editing point EP4), the gain to 67% at the approximately center position of the material (the editing point EP5), and the gain to 51% at the out-point (the editing point EP7), the corresponding points may be clicked respectively on the parameter setting window 35. Thus, the set gain values are automatically registered in the clip database. In addition, also in this case, during the period between the editing point EP4 to the editing point EP5 and the period between the editing point EP5 to the editing point EP7, the gain values are interpolated so as to be linear and successive values based on the values set at respective editing points, and the interpolated values are automatically set.

In this way, if the gain values are set as described above, the gain values are successively changed at respective timings. Therefore, the picture of such image can be obtained that after the video data of the material clip MC-002 is gradually viewed on the video data of the material clip MC-003, the video data of the material clip MC-001 is further viewed on these video data, thereafter, the video data of the material clip MC-002 and the material clip MC-001 gradually become faint.

In addition, in the parameter setting window 35, as shown in FIG. 10, the values of the set parameters are displayed correspondingly to the editing points as a graph having the horizontal axis being time and the vertical axis being gain values. Thereby, an operator looks the display and can visually understand at a glance the parameter, the layer, and the timing which have been set.

The preview window 36 is an area for displaying the video data of the material clip or the resultant clip, when the preview button, the view button, the all preview button, or the all view button described later is operated. The provision of this display area makes it possible to confirm the video image of the material clip or the resultant clip produced as a result of edit, while edit works is being performed.

The device control window 37 is an area for displaying the command buttons for controlling the operation of the video disk recorder 5 in which the video data of clips are stored. As shown in FIG. 10, a reproduction button 37A, a stop button 37B, and six skip buttons 37C to 37H are provided as command buttons. In this case, the reproduction button 37A is a command button for sending the reproduction command to the video disk recorder 5. The stop button is a command button for sending the reproduction stop command to the video disk recorder 5. The skip buttons 37C, 37D are command buttons for sending to the video disk recorder 5 the skip command for skipping the reproduction position to one frame forward or one frame backward. The skip buttons 37E, 37F are command buttons for sending to the video disk recorder 5 the skip command for skipping the reproduction position to one editing point forward or one editing point backward. The skip buttons 37G, 37H are command buttons for sending to the video disk recorder 5 the skip command for skipping the reproduction position to the head position or the end position of the video data. The provision of these command buttons makes it possible to easily control the operation of the video disk recorder 5 while edit works is being performed.

The edit content display window 38 is-called co-time line, and an area for displaying the content of edit specified on the time line window 34. In the time line window 34, since all contents of edit can not be displayed all together because of the restriction of the screen, the graphic image that the content of edit is reduced is displayed on the edit content display window 38, so as to easily understand which content of edit is specified as a whole. For example, in the case where the content of edit such like that three material clips MC-003, MC-002 and MC-001 described above are composed is specified on the time line window 34, the graphic image such that three bar graphic images showing the clips specified to respective layers are superimposed is displayed on the edit content display window 38. Therefore, an operator looks the display, and can entirely understand the contents of the edit specified, which is the composite processing of three clips.

In addition, in the edit content display window 38, also in the case where the resultant clip, which is displayed on the library window 33 and the clip tree window 31 and which has been already registered in the clip database, is selected, the graphic image showing the edit content of the resultant clip is displayed. Therefore, also in the case where the resultant clip displayed on the library window 33 and the clip tree window 31 is selected during the edition on the time line window 34, the contents of edit specified to the selected resultant clip can be easily obtained.

Finally, the control command window 39 is an area for displaying the list of the control commands used in the editing system 1. As shown in FIG. 10, for example, the control commands to be displayed have an editor button (Editor), a composite button (Composite), a special effect button (S-Effect), a preview button (Preview), a view button (View), an all preview button (All Preview), and an all view button (All View), etc.

The editor button, the composite button, and the special effect button are buttons for starting up the respective modules for edit. More specifically, the editor button is a button for starting up the edit module EM. The editor button is clicked to start up the edit module EM even if the composite module CM has been driven for instance. Further, the composite button is a button for starting up the composite module CM. The composite button is clicked to start up the composite module CM even if the special effect module SM has been driven for instance. Further, the special effect button is a button for starting up the special effect module SM. The special effect button is clicked to start up the special effect module SM even if the edit module EM has been driven for instance.

On the other hand, the preview button, the view button, the all preview button, and the all view button are buttons for confirming the content of the material clip or the resultant clip. More specifically, the preview button is a button used for displaying the video data of the selected clip on the preview picture display window 36. When the preview button is operated, since the edit content specified is not executed, the displayed video data may be different from the final result (the video data of the final result is displayed when the edit content has been already executed and the video data corresponding to the edit content has been produced.). However, when the preview button is operated, the display is immediately started, and it is used in the case of checking the length of clip in the edit process.

The view button is a button used for displaying the video data of the selected clip on the preview picture display window 36. The view button is different from the preview button, and the specified edit content is executed. Thus, when the view button is operated, although it takes time to display, the video data after edit can be confirmed.

The all preview button is a button used for displaying the video data from the first clip to be edited to the last clip to be edited on the preview picture display window 36 without selection of clip. Also in the all preview button, the specified edit content is not executed same as that of the preview button.

The all view button is a button used for executing the edit content specified to all clips to be edited and for displaying the video data on the preview picture display window 36. The all view button is operated so that the specified edit content is executed and the video data of the last result can be confirmed. When the edit content is executed, the produced clip vide data is automatically stored in the video disk recorder 5 and registered in the clip database CDB.

(4-2) GUI when the Special Effect Module is Started Up

Next, in this paragraph, the GUI when the special effect module SM is started up will be explained. In the editing system 1, when the special effect module SM is started up, the graphic display shown in FIG. 11 is displayed as a GUI of the special effect module SM on the display 2B of the work station 2.

Figure 11:
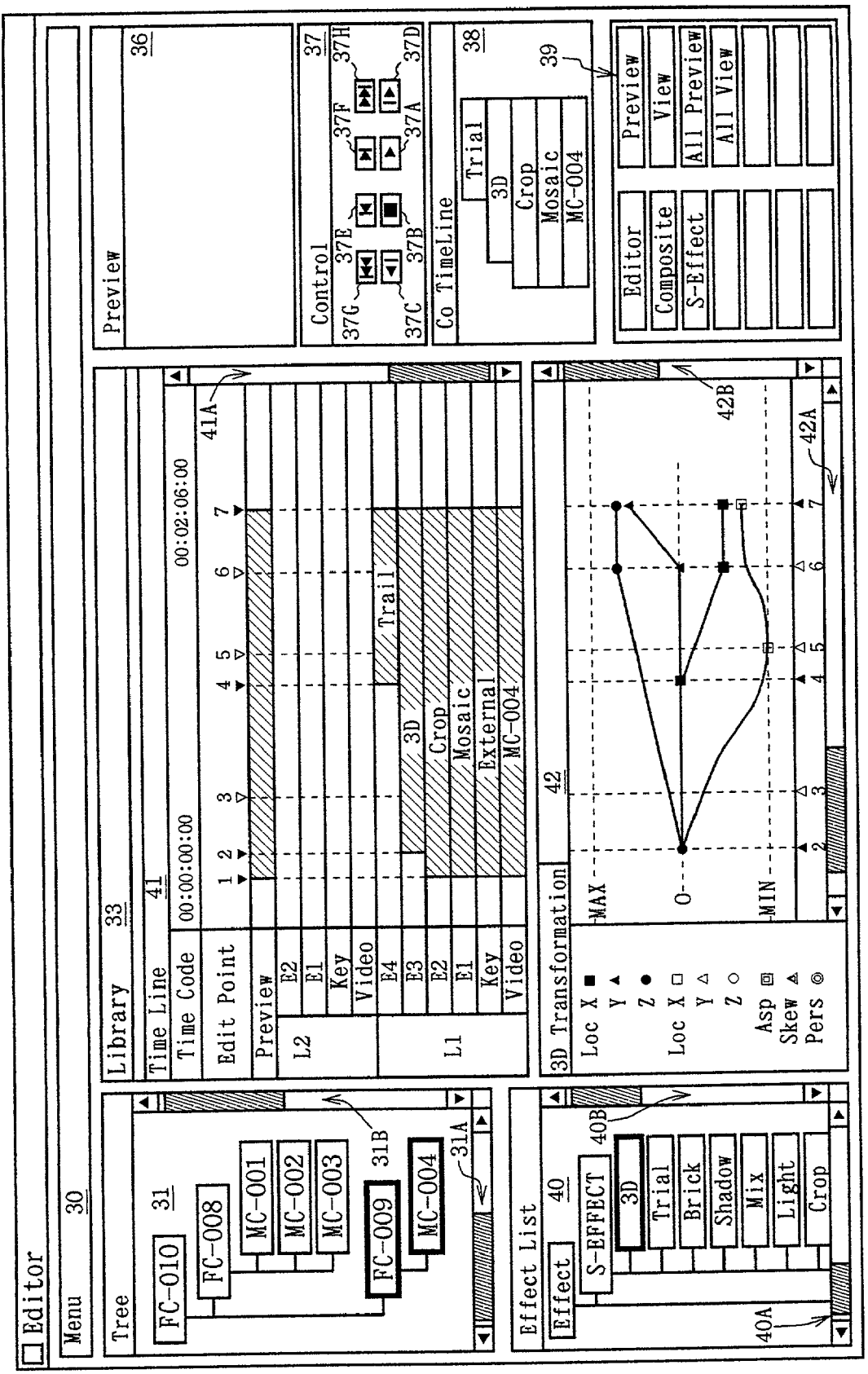
FIG. 11 is a screen image showing the GUI screen displayed when the special effect module is started up.

As shown in FIG. 11, when roughly divided, the GUI of the special effect module SM is composed of a menu window 30, a clip tree window 31, an effect selection window 40, a library window 33, a time line window 41, a parameter setting window 42, a preview screen display window 36, a device control window 37, an edit content display window 38, and a control command window 39.

Note that among the windows displayed on the GUI of the special effect module, the menu window 30, the clip tree window 31, the library window 33, the preview screen display window 36, the device control window 37, the edit content display window 38 and the control command window 39 are same as that of the composite module CM described above, so that the explanation will be omitted here.

First, the effect selection window 40 is an area for selecting the special effect performed on the video data of clip, and the command buttons of various special effects are displayed thereon. The command buttons to be displayed are a three-dimensional button for specifying the three-dimensional transform, a trail button for specifying the trail processing which adds an afterimage, a brick button for specifying the brick processing which puts the video image on the plane of a cube and rotates it, a shadow button for specifying the shadow processing which adds a shadow to the video data, a mix button for specifying the mix processing which mixes the video data, a light button for specifying the light processing which lights up an object from one direction to add the shadow, a crop button for specifying the crop processing which cuts out a predetermined area from the video data, and so on.

In the effect selection window 40, to select a desired special effect, the editing point on which the special effect is performed is designated on the time line window 41, and then the command button corresponding to the desired special effect is clicked so as to automatically specify the special effect.

The time line window 41 is an area for placing the clip to be edited on the time axis to designate the content of edit. On the time line window 41 displayed in the special effect module SM, the contents relating to the special effect processing are displayed. The time line window 41 is divided into areas. When roughly divided successively from the top, the areas are a time code display area (Time Code), an editing point display area (Edit Point), a preview extent display area (Preview), and a clip and special effect specifying area (L1 to L10).

The time code display area is an area for displaying the time code at the editing point. The time code is a time code on the time line of the resultant clip produced based on the edit content designated on the time line window 41.

The editing point display area is an area for indicating a point set as an editing point by a triangle mark. For example, when the special effect processing shown in FIG. 4 and FIG. 8 is specified, the editing points EP1 to EP7 are indicated by using triangle marks.

The preview extent display area is an area for indicating the extent of the video data displayed on the preview screen display window 36 when a preview button and a view button which are described above are operated. In this example, the section between the editing point EP1 and the editing point EP7 (that is, the whole resultant clip FC-009) are set as the display extent, and a bar showing the section is displayed.

The clip and special effect specifying area is an area for specifying for each layer the special effect applied to the clip. In the editing system 1, ten layers of the layer L1 to the layer L10 are prepared, so that the clips to be special-effect processed can be specified to respective layers. Note that the display extent of the clip and special effect specifying area is limited (as shown in the figure, it is for about two layers), and the layers L1 to L10 can not be displayed all together. However, the scroll button 41A displayed at the right side of the clip and special effect specifying area is operated so that the clip and special effect specifying area can be scrolled in the up and down direction. Therefore, a desired layer can be displayed.

Each of the layers L1 to L10 is divided into areas which consists four special effect areas (E1 to E4), a video area (Video) for specifying the clip to which the special effect is applied and a key area (Key) for specifying the key processing performed on the specified clip. The special effect specifying area is an area for designating the special effect applied to the clip registered in the video area. Four special effect specifying areas are provided for one layer, so that four special effects can be applied to one clip at the same time. For example, as shown in FIG. 11, if the mosaic processing is specified as the special effect E1, the crop processing is specified as the special effect E2, the three-dimensional transform is specified as the special effect E3, and the trail processing is specified as the special effect E4, four special effects can be applied to the clip MC-004 specified in the video area.

To set the special effect in the special effect specifying area, the editing points are previously designated to specify the extent to which the special effect is applied, and a desired command button is clicked on the effect selection window 40. Then, the cell indicating the selected special effect is displayed. The cell is placed on the special effect specifying area, so as to set the special effect automatically.

To set the clip in the video area, the clip displayed on the library window 33 is clicked first or the clip displayed on the clip tree window 31 is clicked, so as to select the clip to be edited. Such processing is performed to display the cell of the selected clip. The cell is placed at a desired position of the video area, so that the clip is set to the video area.

Further, to set the key processing in the key area, when the portion of "Key" of the key area is clicked, the effect selection window 40 is changed into the key window 32 described above. A desired key button is clicked to select the key processing. Such processing is performed to display the cell indicating the selected key processing. The cell is placed at the key area, so that the key processing is automatically set.

In addition, when the resultant clip already placed and displayed at the video area is selected by double-clicking, the module of which the resultant clip is produced (that is, the composite module CM, the special effect module SM, or the edit module EM) is started up, and the content of edit applied to the resultant clip is displayed on the time line window of the GUI of the corresponding module.

The parameter setting window 42 is an area for setting parameters of special effect processing specified by an operator. In the parameter setting window 42, if the command button of the effect selection window 40 is clicked, a parameter setting screen relating to the clicked special effect is displayed. For example, if the 3D button is clicked on the effect selection window 40 to specify the three-dimensional transform, the parameter setting screen relating to the three-dimensional transform shown in FIG. 11 is displayed on the parameter setting window 42.

As shown in FIG. 11, the parameters in the three-dimensional transform are the position in the three-dimensional space (X, Y, Z), the rotating direction in the three-dimensional space (X, Y, Z), the aspect ratio (Asp) indicating the ratio of length and breadth of image, the skew (Skew) which is parameter of the distortion, and the perspective value (Pers) representing the value of far and near. These values of parameters can be set to arbitrary values between the maximum setting extent MAX and the minimum setting extent MIN using a default value (="0") as a standard value.

The horizontal axis (i.e., time axis) of the parameter setting window 42 corresponds to that of the time line window 41 each other, and the change point of the parameters can be determined with referring to the content of the special effect processing specified at the time line window 41. In connection, regarding to the horizontal direction, that is the left and right direction, the scroll button 42A placed at the bottom side of the parameter setting window 42 is operated so as to scroll the graphic image on the parameter setting window 42 in the direction of left and right. At this time, since the horizontal axis of the time line window 41 corresponds to that of the parameter setting window 42 each other, the graphic image of the time line window 41 and the graphic image of the parameter setting window 42 are linked and scrolled in the direction of left and right at the same time. In addition, regarding to the up and down direction, the scroll button 42B placed at the right side of the parameter setting window 42 is operated so as to scroll the graphic image on the parameter setting window 42 in the direction of up and down.

Here, to actually set the parameters of the three-dimensional transform, a desired item is first clicked among from the items of parameters displayed at the left corner of the parameter setting window 42 to specify the item that parameter is set next. Then, a point of which parameter is changed is decided and the setting value is decided with viewing the content specified on the time line window 41. The position corresponding to the decided point and the setting value is clicked on the parameter setting window 42 consisting the vertical axis being the parameter value and the horizontal axis being time. Thereby, the parameter value and the parameter changing point corresponding to the clicked position are registered automatically in the clip database CDB.

For example, as shown in FIG. 11, in the case where the position in the X-axis direction is gradually moved from the editing point EP4 to the minus direction, the desired values are successively clicked so as to register the values automatically. Similarly, in the case where the position in the Y-axis direction is gradually moved from the editing point EP6 to the plus direction, the desired values are successively clicked so as to register the values automatically. Similarly, in the case where the position in the Z-axis direction is gradually moved from the editing point EP2 to the plus direction, the desired values are successively clicked so as to register the values automatically. In addition, the sections between the points specified by an operator are interpolated successively and the values such that the video image is continuously moved are automatically set.

Further, in the case of performing the rotation processing such that the video image is slowly rotated in the minus direction with the X-axis being centered in the range from the editing point EP2 to the editing point EP5, and the slowly rotated in the opposite direction after the editing point EP5 by turn, desired values are clicked at the editing point EP5 and the editing point EP7 so as to register the values automatically. In addition, also in this case, the section between the points specified by an operator are interpolated successively and the values such that the video image is continuously rotated are automatically set. In connection, it can be arbitrarily decided by setting that the section is interpolated linearly or interpolated with a spline curve. In this example, the rotation processing is set to be interpolated with a spline curve, so that the values are set in accordance with a spline curve between the points specified by the operator.

In this way, if desired values are set to the parameters of the special effect on the parameter setting window 42, the values of parameters are registered in the clip database CDB, and the special effect is applied to the video data of the clip to be edited based on the registered parameter values. In addition, in the parameter setting window 35, as shown in FIG. 11, the values of the set parameters are displayed corresponding to the editing points on a graph having the horizontal axis being time and the vertical axis being parameter values. Thereby, an operator looks the display and can visually understand at a glance the values, the parameters, and the timings which have been set.

(4-3) GUI when the Edit Module is Started Up

Next, in this paragraph, the GUI when the edit module EM is started up is explained. In the editing system 1, the graphic display shown in FIG. 12 is displayed as a GUI of the edit module EM on the display 2B of the work station 2, when the edit module EM is started up.

Figure 12:
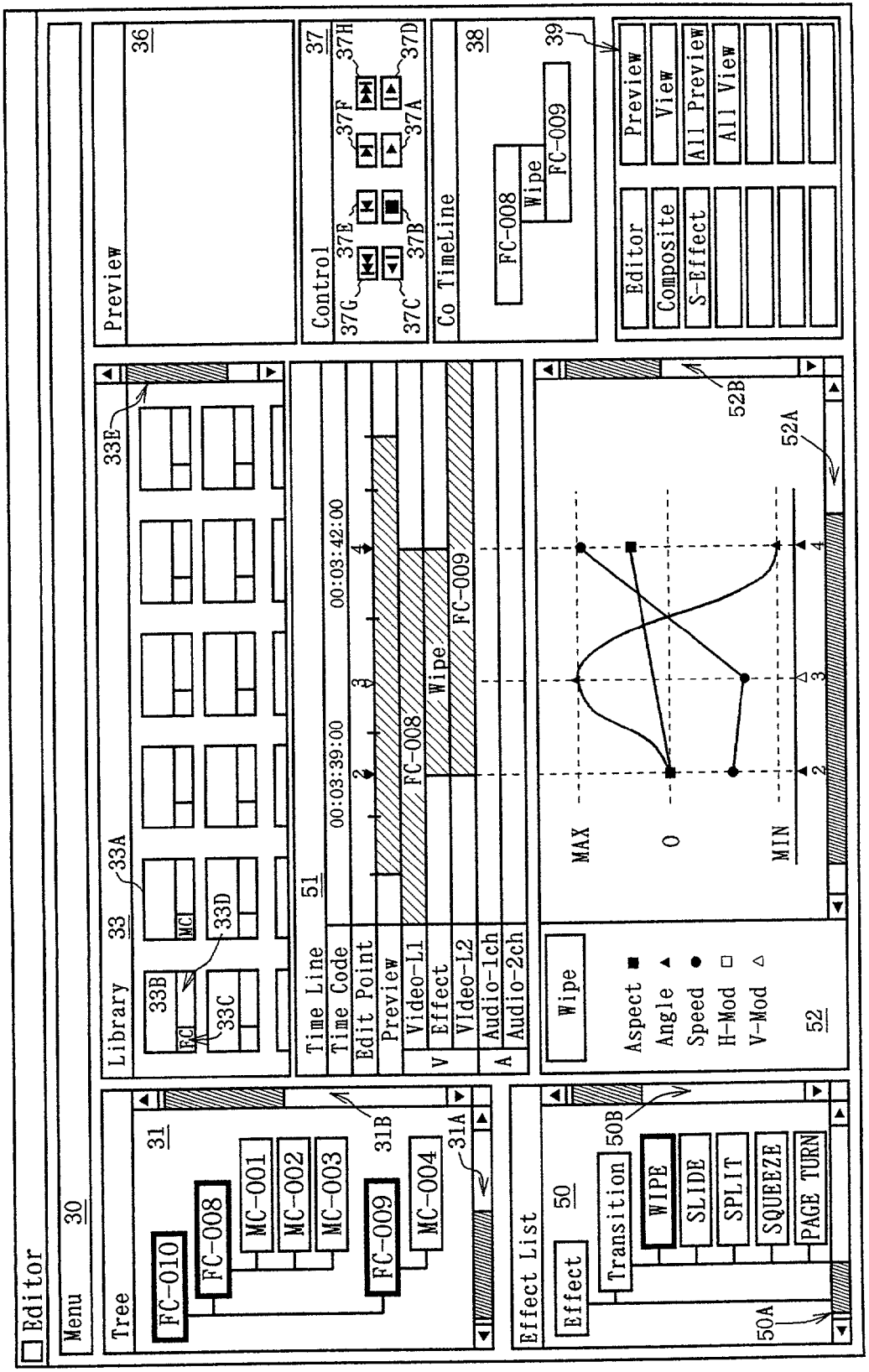
FIG. 12 is a screen image showing the GUI screen displayed when the edit module is started up.

As shown in FIG. 12, when roughly divided, the GUI of the edit module EM is composed of a menu window 30, a clip tree window 31, an effect selection window 50, a library window 33, a time line window 51, a parameter setting window 52, a preview screen display window 36, a device control window 37, an edit content display window 38, and a control command window 39.

Note that among the windows displayed on the GUI of the edit module EM, the menu window 30, the clip tree window 31, the preview screen display window 36, the device control window 37, and the control command window 39 are same as that of the composite module CM described above, so that the explanation is omitted here.

First, the effect selection window 50 is an area for selecting the transition effect used in changing the video data of clip specified as an object to be edited, and the command buttons of various transition effects are displayed thereon. The command buttons to be displayed are a wipe button for specifying the wipe effect which changes an image by wiping the image being displayed at present with a new image, a slide button for specifying the slide effect which changes into a new image by sliding an old image like the Kamishibai (telling a story with picture cards), a split button for specifying the split effect which changes into a new image by splitting an old image to be slid, a squeeze button for specifying the squeeze processing which changes an image by spreading a new image on an old image, and a page turn button for specifying the page turn processing which changes an image by paging an old image, and so on.

In the effect selection window 50, a scroll button 50A of the left and right direction is displayed at the bottom position of the area, so as to scroll the displayed command button in the right and left direction. Similarly, a scroll button 50B of the up and down direction is displayed at the right side position of the effect selection window 50, so as to scroll the displayed command button in the up and down direction.

In the effect selection window 50, to select a desired transition effect, the editing point on which the transition effect is performed is designated on the time line window 51, and then the command button corresponding to the desired transition effect is clicked so as to automatically specify the transition effect.

The library window 33 is an area for displaying the list of the material clips or the resultant clips registered in the clip database CDB. On the library window 33, as shown in FIG. 10 and FIG. 11, although only a title bar is displayed usually, the title bar is clicked to open a window, so that the library window 33 is entirely displayed as shown in FIG. 12.

As shown in FIG. 12, on the library window 33, clips are displayed with a card graphic display 33A. At this time, the card graphic display 33A is composed of a still picture display part 33B, an attribute display part 33C, and a clip name display part 33D. The still picture of the in-point or the out-point of the clip is displayed on the still picture display part 33B. Thereby, an operator can understand easily that which of video data is the clip produced from by viewing the screen displayed on the still picture display part 33B.

The character of "FC" or "MC" showing the attribute of the clip is displayed on the attribute display part 33C. In this case, "FC" shows that the clip is the resultant clip produced as a result of the edit, and "MC" shows that the clip is the material clip only taken out from the source video data. In this way, the information showing the attribute is displayed so that the operator can easily understand whether the clip is the resultant clip or the material clip by viewing the display. The clip name added by the operator is displayed on the clip name display part 33D. Note that the clip name has been registered in the blip database CDB as a clip management data described later.

Thus, in the library window 33, the clip which has been registered already in the clip database CDB is displayed as a list, so that the clip to be edited is easily selected among from the clips already registered.

In addition, a scroll button 33E is displayed at the right side position of the library window 33. The scroll button 33E is operated to scroll the library window 33 in the up and down direction, so that the all clips registered in the library window 33 can be displayed. Therefore, the clip which is not shown at present can be also selected.

The time line window 51 is an area for placing the clips to be edited on the time axis to designate the content of edit. On the time line window 51 displayed at the edit module EM, the content relating to the edit processing is displayed. The time line window 51 is divided into areas. When roughly divided successively from the top, the areas are a time code display area (Time Code), an editing point display area (Edit Point), a preview extent display area (Preview), a video and effect specifying area (V), and an audio specifying area (A).

The time code display area is an area for displaying the time code at the editing point. The time code is a time code on the time line of the resultant clip produced based on the edit content designated on the time line window 51.

The editing point display area is an area for indicating points set as an editing point by triangle marks. For example, when the edit processing shown in FIG. 4 and FIG. 9 is specified, the editing points EP1 to EP5 are indicated by using triangle marks. However, in FIG. 12, since the area and the vicinity on which the transition effect is applied are only displayed on the time line window 51, the editing points EP2 to EP4 are only displayed. In addition, to display the editing point EP1 and the editing point EP5, as described later, the scroll button of the left and right direction is operated on the parameter setting window 52, so that the graphic image in the time line setting window 52 is scrolled in the left and right direction to display the editing point EP1 or the editing point EP5.

The preview extent display area is an area for indicating the extent of the video data displayed on the preview screen display window 36 when a preview button and a view button which are described above are operated. In this example, since the extent from the section between the editing point EP1 and the editing point EP2 to the section between the editing point EP4 and the editing point EP5 are set as the display extent, a bar showing the extent is displayed.

The video and effect specifying area is divided into areas. They are a first and second video area (Video-L1, Video-L2) for specifying the clip to be edit, and an effect area (Effect) for specifying the transition applied to the clip to be edited.

To specify the clip to be edited in the first or second video area, a desired clip is clicked on the library window 33 or the clip tree window 31 to display the cell showing the clip. The cell is placed in the first or second video area, so that the clip is set to the first or second video area and registered as a clip to be edited. For example, if the resultant clip FC-008 is clicked and placed at the first video area, and the resultant clip FC-009 is clicked and placed at the second video area, as shown in FIG. 12, the resultant clips FC-008 and FC-009 are set to the first and second video area respectively. In addition, the video data set to the first video area becomes an old video data, and the video data set the second area becomes the video data newly changed.

Similarly, to specify the transition effect in the effect area, a desired effect button is clicked on the effect selection window 50 to display the cell showing the effect. The cell is placed in the effect area, so that the effect is set to the effect applied to the clip to be edited. For example, if the wipe button is clicked on the effect selection window 50, the cell showing the wipe is displayed. The cell is placed at the effect area, as shown in FIG. 12, the wipe processing is set as a processing of changing the resultant clip FC-008 and the resultant clip FC-009.

The audio specifying area is an area for specifying the audio data output with the video data. In this case, it is divided into the first and second audio areas (Audio-1ch, Audio-2ch). In addition, to set the audio data in the first and second audio areas, similarly to the setting method in the video area, a desired clip is clicked and placed in the first or second audio area, the audio data of the clip is set to the audio data to be output. In connection, the audio data set in the first audio area is output to the first channel of the stereo broadcasting, and the audio data set in the second audio area is output to the second channel of the stereo broadcasting.

In addition, the resultant clip which has been placed in the first or second video area and already displayed is selected by double-clicking, the module which has produced the clip, that is the composite module CM, the special effect module SM, or the edit module EM is started up and the content of the edit which has been applied to the clip is displayed on the time line window of the GUI of the corresponding module.

The parameter setting window 52 is an area for setting parameters relating to the transition effect specified by the operator. In the parameter setting window 52, when the effect button of the effect selection window 50 is clicked, the parameter setting screen relating to the clicked effect is displayed. For example, if the wipe button is clicked on the effect selection window 50 to specify the wipe processing, as shown in FIG. 12, the parameter setting screen relating to the wipe processing is displayed on the parameter setting window 52.

Parameters in the wipe processing, as shown in FIG. 12, are the aspect ratio (Aspect) indicating the ratio of length and breadth of wipe pattern, the angle (Angle) prescribing the angle of wipe pattern, the speed (Speed) prescribing the speed of wipe pattern in changing the image, the horizontal modulation (H Mod) prescribing the wave given in the horizontal direction of the wipe pattern edge, and the vertical modulation (H Mod) prescribing the wave given in the vertical direction of the wipe pattern edge. These parameter values can be set to arbitrary values between the maximum setting extent MAX to the minimum setting extent MIN based on the default value (="0"). However, as the parameter of the speed, the default value is set to the minimum setting extent MIN, and the changeable extent are from the default value to the maximum setting value MAX.

The horizontal axis (that is, time axis) of the parameter setting window 52 corresponds to that of the time line window 51 each other, and the change point of the parameter can be decided, with viewing the content of the edit processing specified on the time line window 51. In connection, with regard to the vertical direction, that is the left and right direction, the scroll button 52A positioned at the bottom of the parameter setting window 52 is operated so as to scroll the graphic image in the parameter setting window 52 in the direction of left and right. At this time, the horizontal axis of the time line window 51 corresponds to that of the parameter setting window 52 each other, the graphic image of the time line window 51 and the graphic image of the parameter setting window 52 are linked and scrolled in the left and right direction at the same time. In addition, with regard to the up and down direction, the scroll button 52B positioned at the right side of the parameter setting window 52 is operated so as to scroll the graphic image in the parameter setting window 52 in the direction of up and down.

Here, to actually set the parameters of the wipe processing, a desired item is first clicked among from the items of parameter displayed at the left corner of the parameter setting window 52 to specify the item of which parameter is set next. Then, a point of where the parameter is changed is decided with viewing the content specified at the time line window 51, and the setting value is decided. The position corresponding to the decided point and the setting value is clicked on the parameter setting window 52 consisting the vertical axis being parameter values and the horizontal axis being time. Thereby, the parameter value and the parameter changing point corresponding to the clicked position are registered automatically in the clip database CDB.

For example, as shown in FIG. 12, in the case where the aspect ratio of the wipe pattern is gradually increased from the editing point EP2 to the editing point EP4, the desired values are successively clicked so as to register the values automatically. In addition, the section between the points specified by an operator are interpolated successively and the values such that the aspect ratio of the wipe pattern is continuously changed are automatically registered.

Similarly, it is desired that the angle of the wipe pattern is gradually increased from the editing point EP2 to the editing point EP3, and the wipe pattern is gradually inclined from the editing point EP3 to the editing point EP4, the desired values are successively clicked so as to register the values automatically. Also in this case, the section between points specified by the operator is interpolated, and the values such that the wipe pattern changes continuously is registered automatically. In connection, it can be arbitrarily decided whether the section is interpolated linearly or interpolated with a spline curve. In this example, the angle is set to be interpolated with a spline curve, so that the section specified by the operator is set to the value which is along the spline curve.

Further, it is desired that the speed of the wipe pattern is fixed from the editing point EP2 to the editing point EP3, and gradually accelerated from the editing point EP3 to the editing point EP4, desired values are successively clicked so as to register the values automatically. In addition, also in this case, the section between points specified by an operator is interpolated, and the value such that the speed of the wipe pattern is continuously changed is registered automatically.

Thus, in the parameter setting window 52, when a desired value is set to the parameter of the transition effect, the value of parameter is registered in the clip database CDM, and the transition effect is applied to the video data of the clip to be edited based on the registered value of parameter. In addition, in the parameter setting window 52, as shown in FIG. 12, the set value of parameters are displayed corresponding to the editing points on a graph having the horizontal axis being time and the vertical axis being parameter values. Thereby, an operator looks the display and can visually understand at a glance the parameters, the values, and the timings which have been set.

The edit content display window 38 is an area for displaying with the graphic image the content of edit specified on the time line window 51. As described above in the time line window 51, in the case of specifying the edit processing such that two clips FC-008, FC-009 are switched by the wipe processing, the graphic image such that the graphic image showing the wipe processing is sandwiched between bar graphic images showing the respective clips unevenly is displayed. Thereby, an operator looks this display so as to easily understand which edit content is indicated as a whole. Specially, as shown in FIG. 12, when only a part of area is displayed on the time line window 51, although the content of entire processing is not easy to understand, looking at the edit content display window 38, the content of entire processing can be easily understood.

(5) Method for Managing the Clip Management Data in the Clip Database

In the editing system 1 according to this invention, the material clips and resultant clips produced by editing the material clips are all registered in the clip database CDB. The data registered in the clip database CDB, when roughly divided, are the clip video data of the material clip and the resultant clip, and the clip management data for managing the clip video data. In this paragraph, the method for managing the clip management data is explained.

FIG. 13 shows a database for the clip management data generated in the clip data base CDB (mainly, RAM 21B), when the edit processing shown in FIGS. 7, 8, and 9 are instructed. The database for managing the clip management data, as shown in FIG. 13, is composed of clip ID code, clip name, attribute, pointer to image data, duration, parent link ID code, child link ID code, enable/disable flag, and work data, when roughly divided.

The clip ID code is an identification number of the serial number automatically added to the clip in the order of being registered as a clip. Therefore, the registered clip can be identified on the basis of the clip ID code.

The attribute of clip is data for identifying whether the clip is only a material clip or the clip is a resultant clip produced by editing a material clip. If it is a material clip, the code "M" is registered as the attribute of the clip. If it is a resultant clip, the code "F" is registered.

The clip name is a name for identifying the clip, which is added to the clip. In this example, when the clip ID code is "001" and the attribute of the clip is "M", the name "MC-001" is automatically added as a clip name. In addition, an arbitrary name can be added as a clip name adapting the user's taste. In connection, the clip name displayed at the clip name display part 33D of the library window 33 is this clip name.

The pointer to the image data is composed of eight-byte data, and is a pointer showing the head address of the clip video data recorded in the video disk recorder 5. In the editing system 1, the clip video data has been stored in the video disk recorder 5 having a plurality of hard disk, and the pointer to the image data indicates the logical address of the hard disk array.

The duration is a time code showing the reproduction period of the clip video data of the clip. That is, it is a time code showing the time from the start to the end of the clip video data.

The parent link ID code is the clip ID code of the clip which is linked thereto as an upper clip. For example, since the material clip MC-001 of which the clip ID code is "001" is linked to the resultant clip FC-008 of which the clip ID code is "008", the clip ID code "008" of the resultant clip FC-008 has been registered as a parent link ID code.

In addition, for the clip which does not have the upper clip because it is the uppermost clip, "000" is registered as a parent link ID code. For example, the resultant clip FC-010 does not have the upper clip, thereby "000" has been registered as a parent link ID code. In this way, if the parent link ID code is "000", it can be easily understand that it is the uppermost clip.

The child link ID code is the clip ID code of the clip which is linked thereto as a lower clip. For example, the material clips MC-001, MVC-002, and MC-003 are linked as a lower clip to the resultant clip FC-008 of which the clip ID code is "008". At this time, the material clip MC-001 is specified as the third layer L3, the material clip MC-002 is specified as the second layer L2, and the material clip MC-003 is specified as the first layer L1. Therefore, "003" has been registered as the clip ID code of the clip which is the lower clip of the resultant clip FC-008 and is specified to the first layer L1, "002" has been registered as the clip ID code of the clip which is the lower clip of the resultant clip FC-008 and is specified to the second layer L2, and "001" has been registered as the clip ID code of the clip which is the lower clip of the resultant clip FC-008 and is specified to the third layer L3. In addition, the lower clip being linked to the lower hierarchy is managed corresponding to the layer, so as to easily understand that which of lower clips is specified to which of layers.

In addition, in the clip having no lower clip, no data is registered as a child link ID code. For example, the material clip MC-001 is only a material clip and has no lower clip, thereby the child link ID code is a blank.

The enable/disable flag is a flag showing whether the clip is enable or disable. When the clip is enable, the code "E" is registered, and when the clip is disable, the code "D" is registered. In connection, if the content of edit specified has been executed and the clip video data has been produced as a result of edit, the enable flag is registered. If the content of edit has not been executed and the clip video data has not been produced, or if although the content of edit has been once executed, thereafter the content of edit and the clip being material is changed so that the clip video data does not correspond to the actual edit content, the disable flag is registered. In addition, the enable/disable flag is provided as a clip management data, so that when the database for clip management data is referred, it can be easily understood whether the clip is enable or disable.

The work data is data showing the edit content specified to the clip. Therefore, some work data has been registered in the resultant clips FC-008, FC-009, and FC-010 produced by edit. However, no work data has been registered in the material clip MC-001 to the material clip MC-007 which has not been produced by edit.

As shown in FIG. 13, when roughly divided, the work data is classified to a module ID code, an editing point data, and an image processing data. The module ID code is an identification number indicating the module used in the edit work for producing the resultant clip. In this case, the code "C" is registered when the composite module CM is used, the code "S" is registered when the special effect module SM is used, and the code "E" is registered when the edit module EM is used.

Also, the editing point data is data composed of all editing points specified to the resultant clip and time codes corresponding to the editing points.

Further, the image processing data is composed of the composite data, the special effect data, and the edit data. The composite data is data being parameter values specified in the composite processing, the special effect data is data being parameter values specified in the special effect processing, and the edit data is data being parameter values specified in the edit processing.

In addition, when the content of edit processing is modified, the contents of these clip management data are rewritten at any time based on the new edit content. However, the old clip management data is not eliminated, and another clip ID code and the clip name are added to be stored as a backup data. For example, when the content of the special effect processing for the resultant clip FC-009 is modified, as shown in FIG. 14, the clip management data before modification is stored as a backup data.

More specifically, when the new special effect processing is instructed to the resultant clip FC-009, the editing point data after modification and the special effect data after modification are produced based on the content of the new special effect processing, and they are registered as a work data in the place of the clip before modification (i.e., the place that the clip ID data is "009") respectively. On the other hand, to the editing point data before modification and the special effect data before modification which have been registered as a work data before the new special effect processing is instructed, the new clip ID code "009BK1" and the clip name "FC-009BK1" are assigned. Then, on the basis of these identification information, they are registered in the other area of the database as a clip management data for backup. However, in the clip management data registered as backup, the enable/disable flag is changed into the code "D" indicating the disable.

In this way, the clip management data before modification is remained as a backup, so that even if you do not like the resultant clip FC-009 after modification, you can easily return to the resultant clip FC-009BK1 before modification based on the clip management data before modification which is remained as a backup.

Here, the editing point data, composite data, special effect data, and edit data which are registered as work data described above are concretely explained hereinafter. First, referring to FIGS. 15 to 17, the editing point data is explained.

When the composite processing shown in FIG. 7 is instructed to the resultant clip FC-008, the editing point shown in FIG. 15 is registered. As shown in FIG. 15, the editing point data is data for specifying that which part of the lower clips is used to the clip video data of the upper clip, and is composed of the time code of in-point indicating the starting position of the lower clip and the time code of out-point indicating the end position.

As shown in FIG. 7, the time code of the in-point of the material clip MC-003 specified as the first layer L1 is "00:00:31:02" on the time line t3, and the position of the in-point corresponds to the time code "00:00:00:00" on the time line t8 of the resultant clip FC-008. Therefore, in the editing point data, as shown in FIG. 15, the time code "00:00:00:00" of the resultant clip FC-008 and the time code "00:00:31:02" of the in-point of the material clip MC-003 are correspondingly registered at the editing point EP1. Further, as shown in FIG. 7, the time code of the out-point of the material clip MC-003 specified as the first layer L1 is "00:05:18:02" on the time line t3, and the position of the out-point corresponds to the time code "00:04:47:00" on the time line t8 of the resultant clip FC-008. Therefore, in the editing point data, as shown in FIG. 15, the time code "00:04:47:00" of the resultant clip FC-008 and the time code "00:05:18:02" of the out-point of the material clip MC-003 are correspondingly registered at the editing point EP8. The editing point of the material clip MC-003 specified as the first layer L1 is decided by the time codes of the in-point and the out-point.

Similarly, as shown in FIG. 15, the time codes "00:00:51:00" and "00:03:04:20" of the in-point and out-point of the material clip FC-002 specified as the second layer L2 are also registered correspondingly to the time codes of the resultant clip FC-008. Also, the time codes "00:01:40:03" and "00:02:45:48" of the in-point and out-point of the material clip FC-001 specified as the third layer L3 are also registered correspondingly to the time codes of the resultant clip FC-008.

When the special effect processing shown in FIG. 8 is instructed to the resultant clip FC-009, the editing point data shown in FIG. 16 is registered. As shown in FIG. 16, also in the case of special effect processing, in the editing point data, the time code of the lower clip and the time code of the upper clip are registered correspondingly. More specially, as shown in FIG. 16, the time codes of the in-point and the out-point of the material clip MC-004 "00:10:12:00" and "00:12:18:00" are registered with corresponding to the time code of the resultant clip FC-009.

Further, when the edit processing shown in FIG. 9 is instructed to the resultant clip FC-010, the editing point data shown in FIG. 17 is registered. As shown in FIG. 17, also in the case of edit processing, in the editing point data, the time code of the lower clip and the time code of the upper clip are registered correspondingly. More specially, as shown in FIG. 17, the time codes of the in-point and the out-point of the resultant clip FC-008 specified as the first layer L1 "00:01:01:20" and "00:04:43:00" are registered with corresponding to the time code of the resultant clip FC-010, and as shown in FIG. 17, the time codes of the in-point and the out-point of the resultant clip FC-009 specified as the second layer L2 "00:00:00:50" and "00:02:06:00" are registered with corresponding to the time code of the resultant clip FC-010.

Next, referring to FIG. 18, the composite data is explained. The composite data is data for showing the composite ratio (gain) when the video data of the clip specified to each layer is composed, and takes a value from "0" to "100". In addition, if the composite data is "0", this means that the video data to be composed is composed with the ratio of 0%, and the video data at a lower layer is completely viewed transparently in this case. If the value of the composite data is "50", this means that the video data to be composed is composed with the ratio of 50%, and a half of the video data of the lower layer is viewed transparently. If the value of the composite data is "100", this means that the video data to be composed is composed with the ratio of 100%, and the video data of the lower layer is completely hidden and not viewed.

Here, the concrete example is shown in FIG. 18. FIG. 18 shows a database of the composite data produced when the composite data (gain) is specified by using the parameter setting window 35 shown in FIG. 10.

When the gain "100" is specified to the material clip MC-003 specified to the first layer L1 at a position of the editing point EP1 and a position of the editing point EP8, as shown in FIG. 18, the gain "100" is registered in the column corresponding to the editing point EP1 and the editing point EP8. Further, since the section between the editing point EP1 and the editing point EP8 is linearly interpolated based on the value using the editing points EP1 and EP8 as key points, the gain "100" is automatically registered (in the figure, "--" shows that the interpolated value is registered).

Also, when the gain "59" is specified to the material clip MC-002 specified to the second layer L2 at a position of the editing point EP2, the gain "100" is specified at a position of the editing point EP3, and the gain "0" is specified at a position of the editing point EP6, as shown in FIG. 18, the gain "59", "100", and "0" are respectively and successively registered in the columns corresponding to the editing points EP2, EP3, and EP6. Also in this case, since the section between the editing point EP2 and the editing point EP3 and the section between the editing point EP3 and the editing point EP6 are linearly interpolated based on the values using the editing points EP2, EP3, and EP6 as key points, the gain values which continue linearly are automatically registered.

Also, when the gain "100" is specified to the material clip MC-001 specified to the third layer L3 at a position of the editing point EP4, the gain "67" is specified at a position of the editing point EP5 and the gain "51" is specified at a position of the editing point EP7, as shown in FIG. 18, the gain "100", "67", and "51" are respectively and successively registered in the columns corresponding to the editing points EP4, EP5, and EP7. Also in this case, since the section between the editing point EP4 and the editing point EP5 and the section between the editing point EP5 and the editing point EP7 are linearly interpolated based on the values using the editing points EP4, EP5, and EP7 as key points, the gain values which continue linearly are automatically registered.

Thus, the composite data described above are registered to execute the edit processing, so that the values of the composite data can be changed at a timing of each editing point at any time. As a result, the video image such that the video image of the material clip MC-002 specified to the layer L2 is gradually appeared on the video image of the material clip MC-003 specified as the layer L1 from the point in time of the editing point EP2, and then after the editing point EP3, the video image of the material clip MC-002 becomes faint gradually, and at the point in time of the editing point EP4, the video image of the material clip MC-001 specified as the layer L3 is appeared, thereafter, it becomes faint gradually, can be obtained.

Next, referring to FIG. 19, the special effect data is explained. The special effect data is basically composed of an effect ID data showing the type of the special effect processing applied to the clip to be edited, each parameter value of the specified special effect processing, and period that the special effect processing is performed.

Here, the concrete example of the special effect processing shows in FIG. 19. FIG. 19 shows a database of the special effect data relating to the three-dimensional transform shown in FIG. 8 and a database of the special effect data produced when the parameter is set by using the parameter setting window 42 shown in FIG. 11.

In FIG. 19, "1025" registered as the effect ID data is an effect identification number assigned to the three-dimensional transform, and it can be known that the three-dimensional transform is specified as a special effect processing by the effect identification number "1025". Also, "Loc X", "Loc Y", and "Loc Z" represent the position (X, Y, Z) being parameters of the three-dimensional transform. "Rot X", "Rot Y", and "Rot Z" represent the rotation direction (X, Y, Z) being parameters of the three-dimensional transform. "Asp" represents the aspect ratio being parameter of the three-dimensional transform. "Skew" represents the skew being parameter of the three-dimensional transform. "Pers" represents the perspective value being parameter of the three-dimensional transform. As shown in FIG. 19, these parameters are specified from the editing point EP2 to the editing point EP7. Thereby, it can be easily understood that the editing point EP2 is the starting point and the editing point EP7 is the end point, as to the period where the three-dimensional transform is specified. In addition, the concrete values of the starting point and the end point of the three-dimensional transform, that are the time codes, are easily obtained by referring to the editing point data of FIG. 16 explained above.

Here, in the parameter setting window 42 shown in FIG. 11, when the coordinate values "0", "0", "−1.6", and "−1.6" are respectively specified to the parameter "Loc X" at the editing points EP2, EP4, EP6, and EP7, as shown in FIG. 19, the coordinate values "0", "0", "−1.6", and "−1.6" are registered in the columns corresponding to the editing points EP2, EP4, EP6, and EP7. In this case, the sections between the editing point EP2 and the editing point EP4, between the editing point EP4 and the editing point EP6, between the editing point EP6 and the editing point EP7, are linearly interpolated based on the values using the editing points EP2, EP4, EP6, and EP7 as key points, and the coordinate values which continue linearly are automatically registered.

Similarly, when the coordinate values "0", "0", and "+2" are respectively specified to the parameter "Loc Y" at the editing points EP2, EP6, and EP7, the corresponding coordinate values are registered in the columns corresponding to the editing points EP2, EP6, and EP7. When the coordinate values "0", "+2.2", and "+2.2" are respectively specified to the parameter "Loc Z" at the editing points EP2, EP6, and EP7, the corresponding coordinate values are registered in the columns corresponding to the editing points EP2, EP6, and EP7.

Further, when the rotation angles "0", "−180", and "−102" are respectively specified to the parameter "Rot X" at the editing points EP2, EP5, and EP7, the corresponding rotation angles are registered in the columns corresponding to the editing points EP2, EP5, and EP7. In addition, since the interpolation with a spline curve is set in this case, the values which continue along a spline curve are automatically registered between the editing point EP2 and the editing point EP5 and between the editing point EP5 and the editing point EP7. Moreover, regarding to the parameters "Rot Y", "Rot Z", "Asp", "Skew", and "Pers" which are not specified, "0" is registered automatically as a default value.

In this way, when the parameters relating to the three-dimensional transform are registered to execute the edit work, the values of parameters are changed at a timing of each editing point, and at the same time, changed into the interpolated values between respective editing points. As a result, the video image which moves in the three-dimensional space with rotating using the X-axis as a shaft can be obtained.

Next, referring to FIG. 20, the edit data is explained. The edit data is basically composed of an effect ID data showing the type of the transition effect applied to the clip to be edited, each parameter value of the specified transition effect, and period that the transition effect is performed.

Here, the concrete example of the edit data shows in FIG. 20. FIG. 20 shows a database of the edit data produced when the wipe processing shown in FIG. 9 is specified as a transition effect and when the parameter is set by using the parameter setting window 52 shown in FIG. 12.

In FIG. 20, "0001" registered as the effect ID data is an effect identification number assigned to the wipe processing that the image of the first video data is changed into the image of the second video data in the direction from the left side to the right side of the screen, and the effect identification number "0001" means that the wipe processing is specified as a transition effect.

In addition, when the effect identification number "1300" is registered as an effect ID data, it means that the wipe processing is specified such that the image of the first video data is changed into the image of the second video data in the direction from the both sides of the screen to the center. When the effect identification number "2123" is registered as an effect ID data, it means that the page turn processing is specified such that the image of the first video data is changed as if a page is turned.

Further, "Aspect" is a parameter indicating the ratio of length and breadth of wipe pattern, "Angle" is a parameter indicating the angle of wipe pattern, "Speed" is a parameter indicating the speed to change, and "H-Mod" and "V-Mod" are parameters indicating the wave of the wipe pattern respectively. As shown in FIG. 20, these parameters are specified from the editing point EP2 to the editing point EP4, thereby, it can be easily obtained that the editing point EP2 is the start point and the editing point EP4 is the end point as a period that the wipe processing is specified. In addition, the concrete values of the start point and the end point of the wipe processing, that are time codes, can be easily obtained by referring to the editing point data of FIG. 17 explained above.

Here, when the values "0" and "+25" are respectively specified to the parameter "Aspect" at the editing points EP2 and EP4, as shown in FIG. 20, the corresponding values are registered in the columns corresponding to the editing points EP2 and EP4. In this case, the section between the editing point EP2 and the editing point EP4 is linearly interpolated based on the values using the editing point EP2 and the editing point EP4 as key points, and the values which continue linearly are registered automatically.

Also, when the values "20", "20", and "100" are respectively specified to the parameter "Speed" at the editing points EP2, EP3, and EP4, the corresponding values are registered in the columns corresponding to the editing points EP2, EP3, and EP4. Also in this case, the section between the editing point EP2 and the editing point EP3 and the section between the editing point EP3 and the editing point EP4 are linearly interpolated based on the values using the editing points EP2, EP3, and EP4 as key points, and the values which continue linearly are registered automatically.

While, when the values "0", "+180", and "−180" are respectively specified to the parameter "Angle" at the editing points EP2, EP3, and EP4, the corresponding values are registered in the columns corresponding to the editing points EP2, EP3, and EP4. Since the interpolation with a spline curve is set in this case, the values which continue along a spline curve are automatically registered between the editing point EP2 and the editing point EP3 and between the editing point EP3 and the editing point EP4. Moreover, regarding to the parameters "H-Mod" and "V-Mod" which are not specified, "0" is registered automatically as a default value.

In this way, when the parameters relating to the wipe processing are registered to execute the edition work, the values of parameters are changed at a timing of the editing point, and at the same time, changed into the interpolated values between respective editing points. As a result, the video image of the transition effect that the shape, angle, and speed of wipe pattern are changed successively can be obtained.

(6) Procedures in the Editing System

Next, in this paragraph, the operation procedure of each processing in the editing system 1 will be explained using flowcharts. Note that the contents of the operation procedures explained hereinafter are all performed by the operation of a CPU 21 based on the application program.

Figure 21:
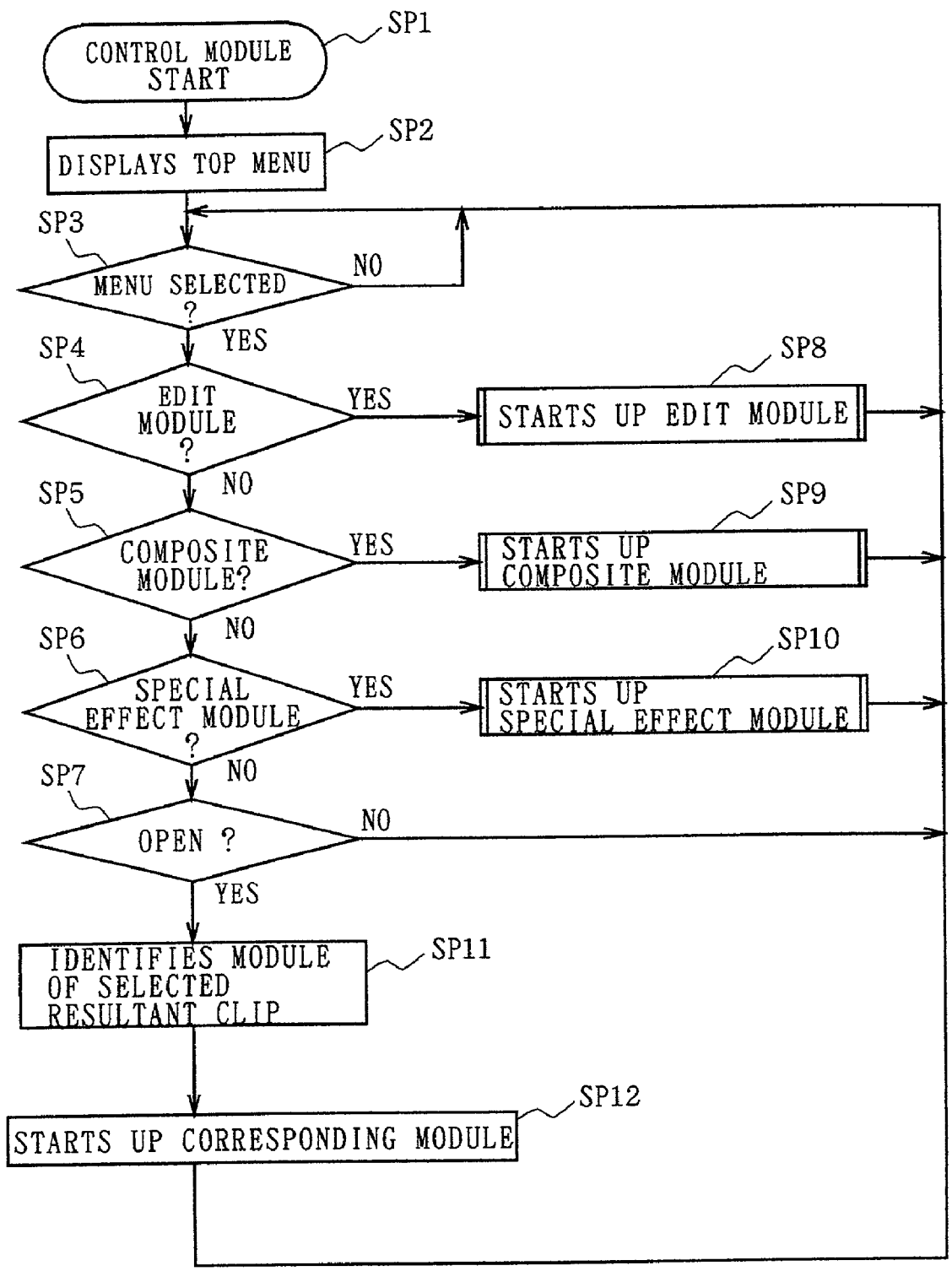
FIG. 21 is a flowchart explaining the operation when the control module is started up.

When the editing system 1 is started up with a predetermined method, the CPU 21 initially starts up the control module CNTM at step SP1 shown in FIG. 21, and displays a top menu on the display 2B of the work station 2 at next step SP2.

At next step SP3, the CPU 21 determines whether or not any item of menu is selected on the top menu. As a result, when the item of menu is selected, the item of menu is determined in following steps SP4 to SP7.

As the result of the determination of step SP4, when the start-up command of the edit module EM is selected, the CPU 21 proceeds to step SP8 to perform the start-up processing of the edit module EM. As the result of the determination of step SP5, when the start-up command of the composite module CM is selected, the CPU 21 proceeds to step SP9 to perform the startup processing of the composite module CM. As the result of the determination of step SP6, when the start-up command of the special-effect module SM is selected, the CPU 21 proceeds to step SP10 to perform the start-up processing of the special-effect module SM.

While, as the result of the determination of step SP7, when the command for opening a file of the resultant clip already registered is selected, the CPU 21 identifies the module used in the selected resultant clip at the next step SP11 and starts up the identified module (that is, the edit module EM, the composite module CM, or the special effect module SM) at next step SP12. In addition, at step SP11, the CPU 21 refers the work data registered in the clip database CDB, so as to identify the module of the resultant clip selected.

Figure 22:
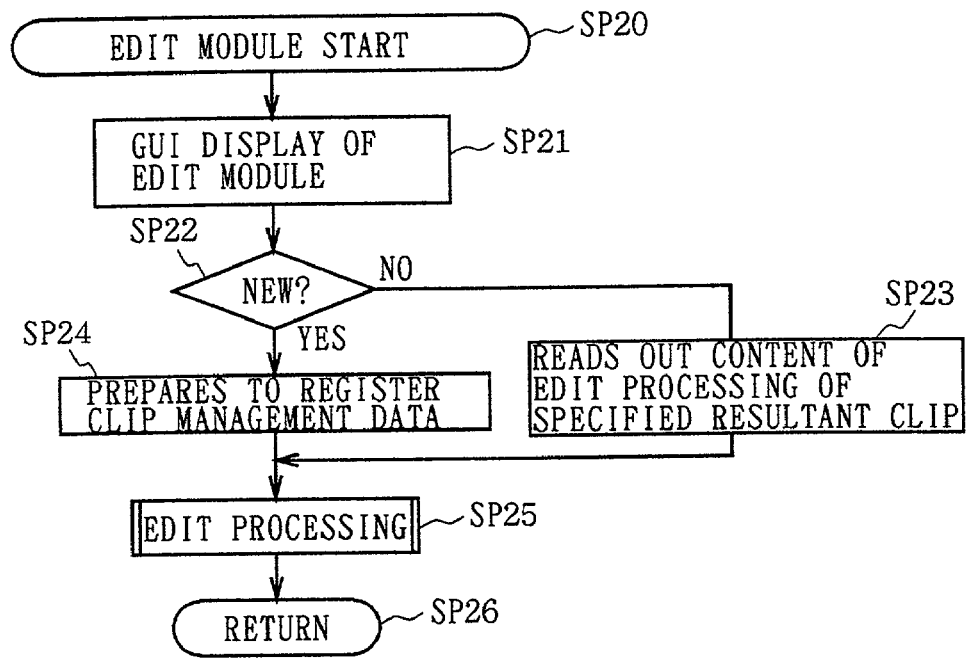
FIG. 22 is a flowchart explaining the operation when the edit module is started up.

Here, FIG. 22 concretely shows the start-up processing of the edit module EM at step SP8. When the edit module EM is instructed to start up, the CPU 21 first displays the GUI of the edit module EM on the display 2B of the work station 2 at step SP21 entering from step SP20. At next step SP22, the CPU 21 determines whether or not the start-up of the edit module EM is instructed through the above step SP12. When the start-up of the edit module EM is instructed through step SP12, the CPU 21 proceeds to step SP23 to read out the content of edit processing of the specified resultant clip based on the clip management data registered in the clip database CDB, and displays the content of the edit processing on the time line window 51 of the GUI for edit module described above.

On the other hand, as the result of the determination of step SP22, when the start-up through step SP12 is not instructed but the newly start-up is instructed, the CPU 21 proceeds to step SP24 to prepare the registration of the clip management data for a newly edit processing. More specifically, the area for registering the clip management data is secured on the clip database CDB in order to provide the content of the edit processing newly instructed. After the processing of step SP23 or step SP24 is performed, the CPU 21 proceeds to step 25 to perform the actual edit processing.

Figure 23:
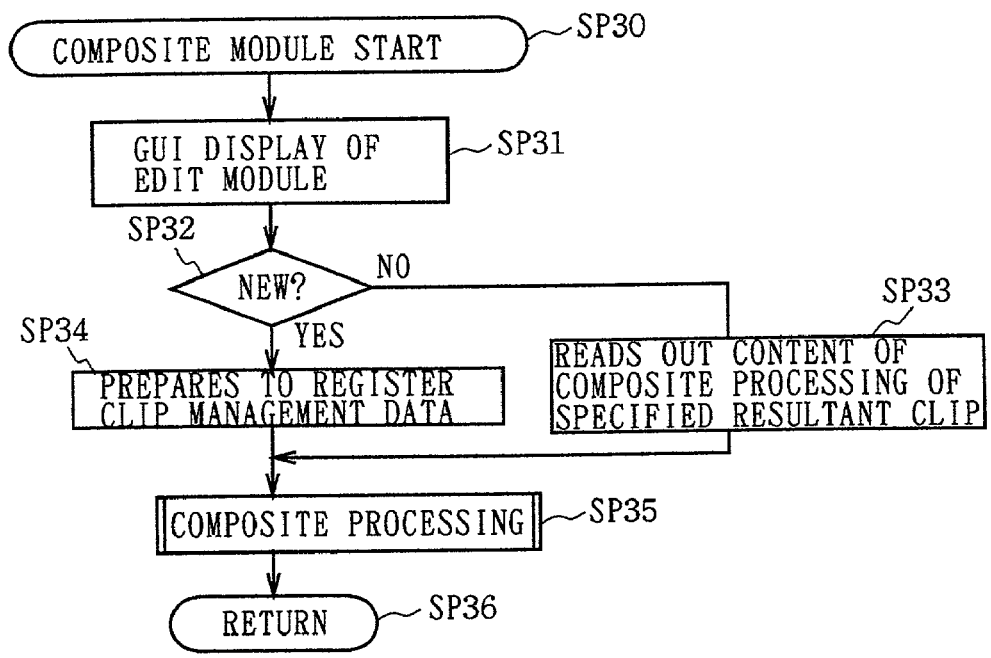
FIG. 23 is a flowchart explaining the operation when the composite module is started up.

Further, FIG. 23 concretely shows the start-up processing of the composite module CM at step SP9. When the composite module CM is instructed to start up, the CPU 21 first displays the GUI of the composite module CM on the display 2B of the work station 2 at step SP31 entering from step SP30. At next step SP32, the CPU 21 determines whether or not the start-up of the composite module CM is instructed through the above step SP12. When the start-up of the composite module CM is instructed through step SP12, the CPU 21 proceeds to step SP33 to read out the content of composite processing of the specified resultant clip based on the clip management data registered in the clip database CDB, and displays the content of the composite processing on the time line window 34 of the GUI for composite module described above.

On the other hand, as the result of the determination of step SP32, when the start-up through step SP12 is not instructed but the newly start-up is instructed, the CPU 21 proceeds to step SP34 to prepare the registration of the clip management data for a newly composite processing. More specifically, the area for registering the clip management data is secured on the clip database CDB in order to provide the content of the composite processing newly instructed. After the processing of step SP33 or step SP34 is performed, the CPU 21 proceeds to step 35 to perform the actual composite processing.

Figure 24:
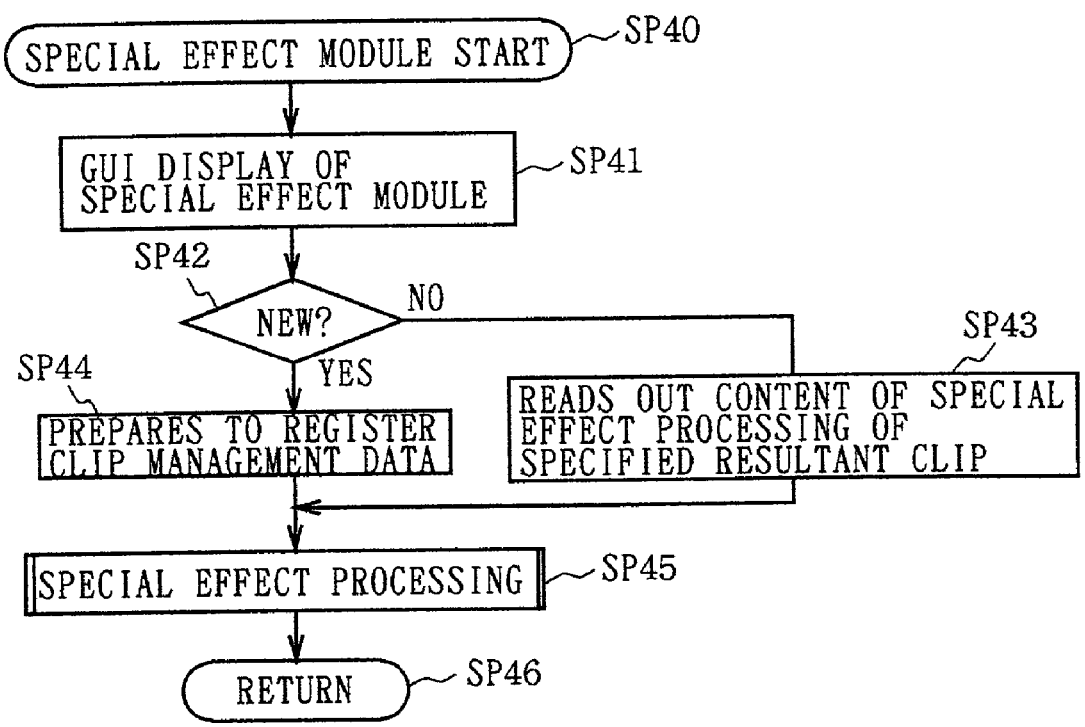
FIG. 24 is a flowchart explaining the operation when the special effect module is started up.

Further, FIG. 24 concretely shows the start-up processing of the special effect module SM at step SP10. When the special effect module SM is instructed to start up, the CPU 21 first displays the GUI of the special effect module SM on the display 2B of the work station 2 at step SP41 entering from step SP40. At next step SP42, the CPU 21 determines whether or not the start-up of the special effect module SM is instructed through the above step SP12. When the start-up of the special effect module SM is instructed through step SP12, the CPU 21 proceeds to step SP43 to read out the content of special-effect processing of the specified resultant clip based on the clip management data registered in the clip database CDB, and displays the content of the special effect processing on the time line window 41 of the GUI for special effect module described above.

On the other hand, as the result of the determination of step SP42, when the start-up through step SP12 is not instructed but the newly start-up is instructed, the CPU 21 proceeds to step SP44 to prepare the registration of the clip management data for a newly special effect processing. More specifically, the area for registering the clip management data is secured on the clip database CDB in order to provide the content of the special effect processing newly instructed. After the processing of step SP43 or step SP44 is performed, the CPU 21 proceeds to step 45 to perform the actual special effect processing.

Figure 25:
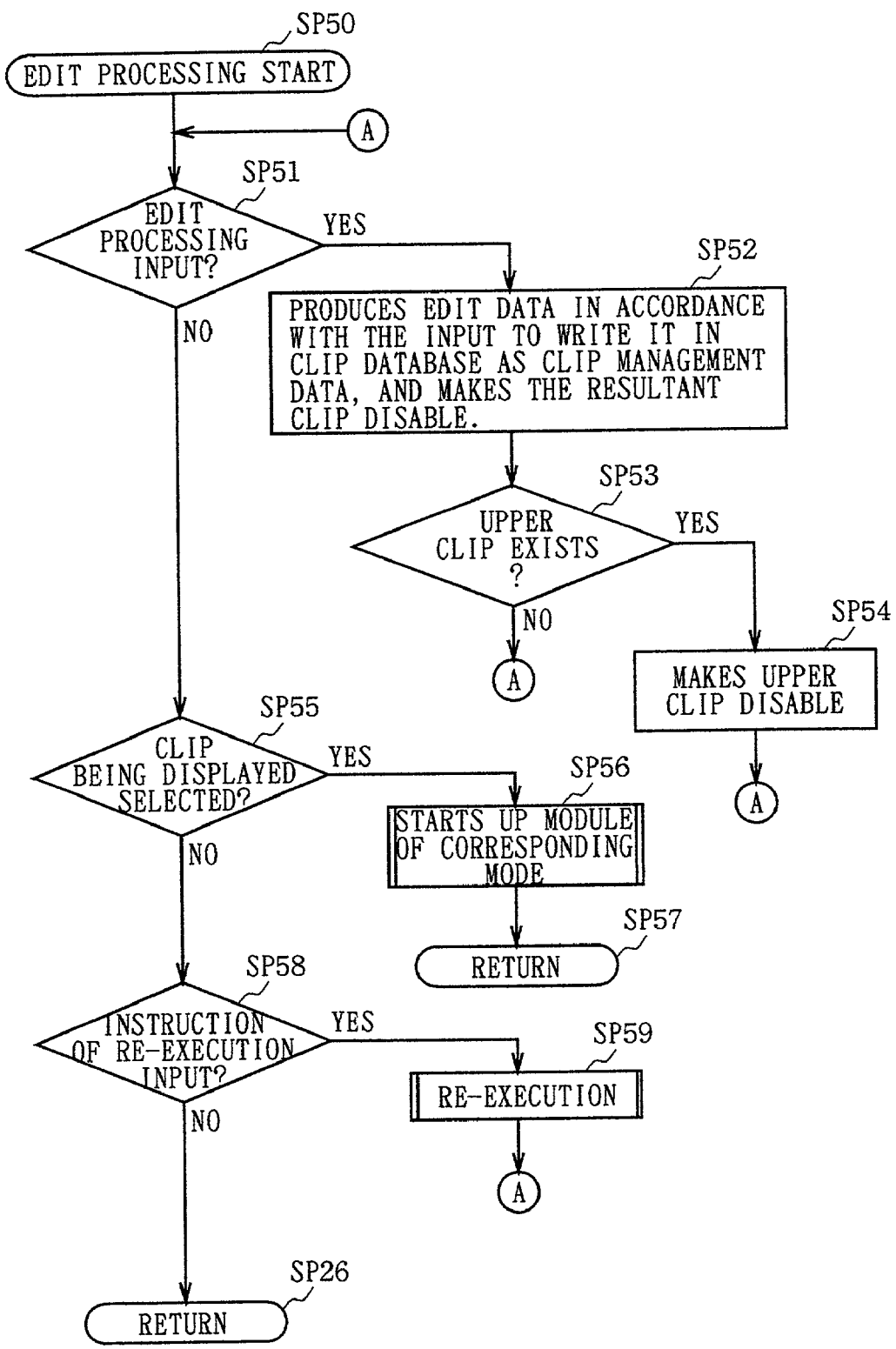
FIG. 25 is a flowchart explaining the operation in the edition processing.

Here, the details of the edit processing at the step SP25 of FIG. 22 are illustrated in FIG. 25. Note that the figure is omitted, but the composite processing at step SP35 of FIG. 23 and the special effect processing at step SP45 of FIG. 24 are mostly same as that of the edit processing of FIG. 25. The difference is only that the content of the edit processing is changed into that of the composite processing or the special effect processing.

As shown in FIG. 25, the CPU 21 first determines whether or not an input for instructing the edit processing is supplied at step SP51 entering from step SP50 (e.g., determines whether or not the operation using the time line window 51 or the operation using the parameter setting window 52 exists). As a result, when the input is supplied, the CPU 21 proceeds to step S52, so that edit data corresponding to the input is produced to suitably write it in the clip database CDB as a clip management data, and the enable/disable flag of the resultant clip is set to disable. If the input is to read out the resultant clip already registered and modify the content thereof, the CPU 21 dose not only overwrite, but also assigns another code to the clip management data before modification and maintains it in the other area. Thus, the clip management data before modification can be read later.

When the processing of step SP52 is completed, the CPU 21 proceeds to next step SP53. At step SP53, the CPU 21 refers the parent link ID code of the clip management data, so as to determine whether or not the upper clip of the clip management data exists. As a result, when there is no upper clip, the CPU 21 returns to step SP51. When the upper clip exists, the CPU 21 proceeds to step SP54 to set the enable/disable flag of the clip management data for managing the upper clip to disable, thereafter, returns to step SP51. In addition, the case of proceeding to the step SP54 is mostly when the resultant clip already registered is modified. Further, the upper clip includes not only the upper clip having the resultant clip produced at step SP52 as a lower clip, but also includes the resultant clip having this upper clip further as a lower clip and at least all resultant clips using this resultant clip as a material (hereinafter, referred to as associated clips).

Figure 26:
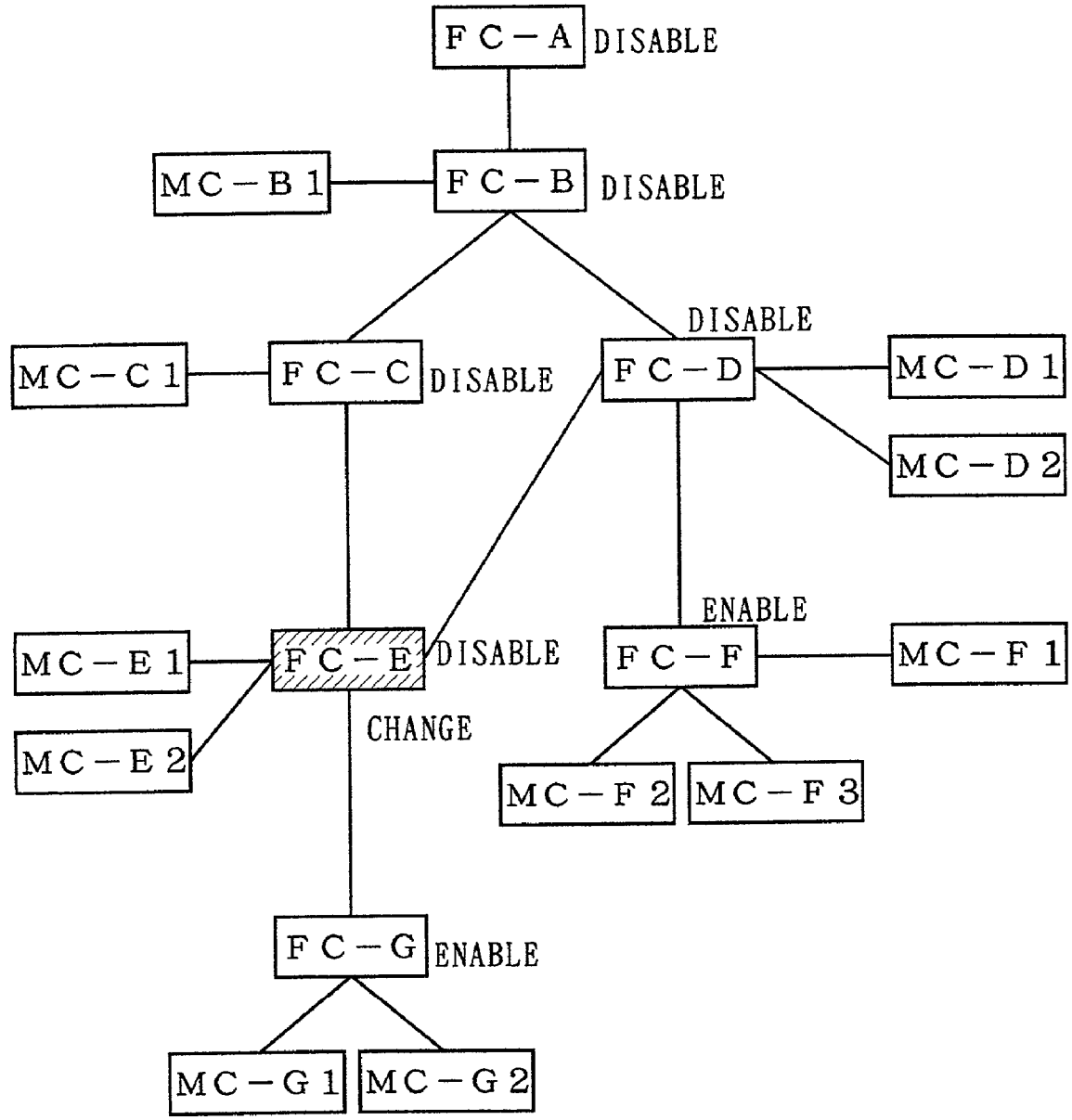
FIG. 26 is a schematic diagram explaining an arbitrary resultant clip when the content of edit is modified.

For example, it is assumed that the relation between each material clip and the resultant clip is as shown in FIG. 26. More specifically, a resultant clip FC-G is produced from material clips MC-G1 and MC-G2, and a resultant clip FC-E is produced from the resultant clip FC-G and material clips MC-E1 and MC-E2 as materials. A resultant clip FC-C is produced from the resultant clip FC-E and a material clip MC-C1 as materials.

Further, a resultant clip FC-F is produced from material clips MC-F1, MC-F2, and MC-F3 as materials, and a resultant clip FC-D is produced from the resultant clip FC-F and material clips MC-D1 and MC-D2 as materials. Furthermore, the resultant clip FC-B is produced from the resultant clips FC-D and FC-C and material clip MC-B1 as materials, and a resultant clip FC-A is produced from the resultant clip FC-B as a material.

When there is such relation between clips, as far as the modification is not added after the clip video data of the respective resultant clips are produced once, the enable/disable flag of the clip management data for managing these clips is normally set to enable. However, the content of the edit processing of the resultant clip FC-E is modified for example, the enable/disable flag of the resultant clip FC-E is naturally set to disable. The enable/disable flag are set to disable not only for the resultant clip FC-E but also for the resultant clips FC-C and FC-D which have the resultant clip FC-E as a lower clip, the resultant clip FC-B having the resultant clips FC-C and FC-D as lower clips, and moreover, the resultant clip FC-A having the resultant clip FC-B as a lower clip.

The flowchart shown in FIG. 25 is explained again. As the result of the determination of step SP51, in the case where the edit processing is not inputted specially, the CPU 21 proceeds to next step SP55. At step SP55, the CPU 21 determines whether or not the resultant clip displayed at the video area of the time line window 51 has been selected. When the displayed resultant clip has been selected, the CPU 21 starts up the module which has produced the resultant clip (i.e., the composite module CM or the special effect module SM) at step SP56. When the displayed resultant clip is not selected, the CPU 21 proceeds to step SP58. Note that the details of step SP56 will be described later.

At step SP58, the CPU 21 determines whether or not the re-execution instruction is input, and when it is input, proceeds to step SP59 to perform the re-execution processing. When the re-execution instruction is not input, the CPU 21 returns to the original flowchart through step SP26. In addition, the re-execution described here means that the view button or the all view button displayed on the GUI screen is clicked by the mouse 2D and the instruction of the view or all view is input. At the time of the view or all view, the content of the specified edit processing is actually executed to produce the video clip data of the resultant clip, so that such name is given.

Figure 27:
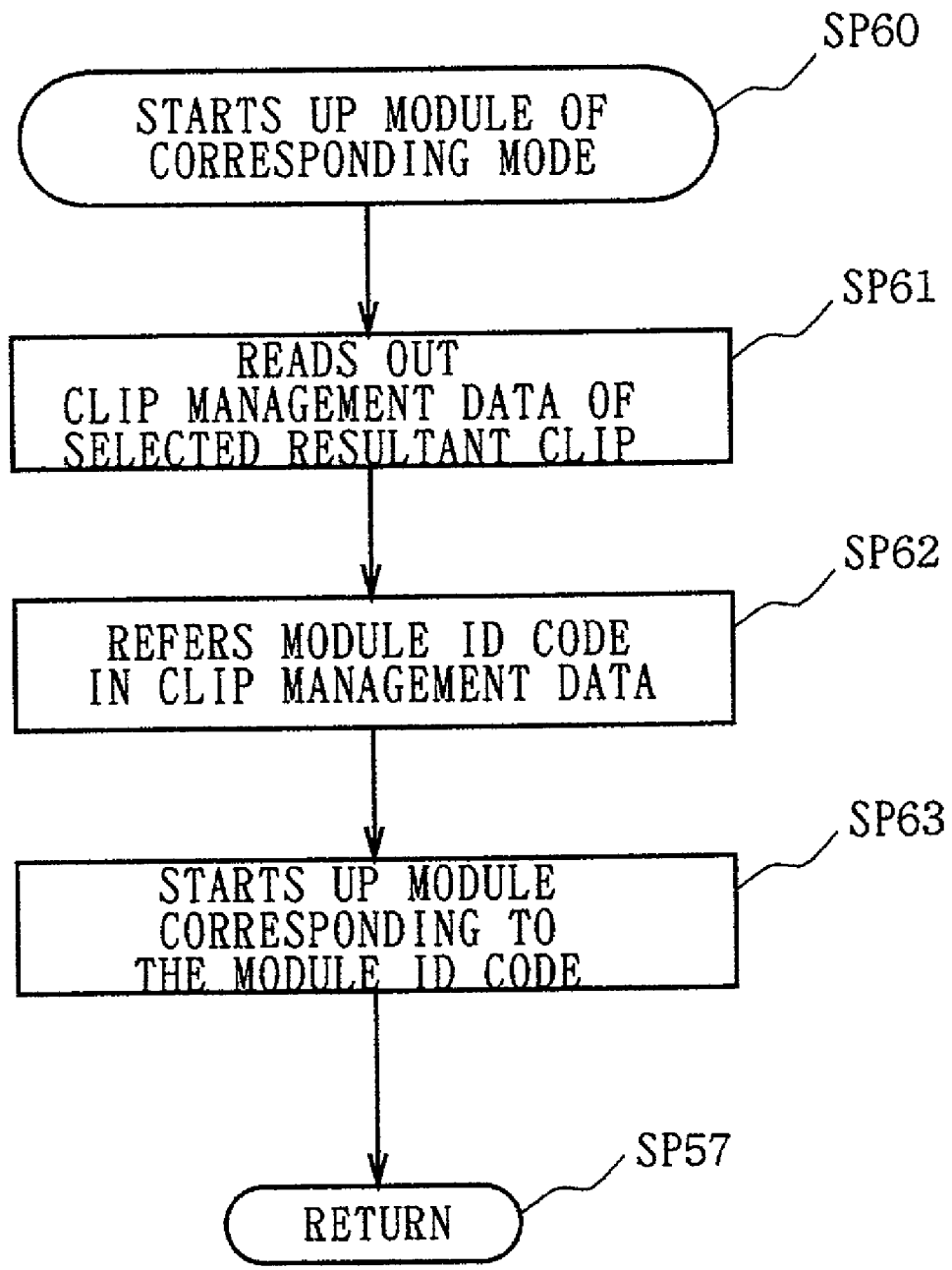
FIG. 27 is a flowchart explaining the operation when the other module is started up during a predetermined module has been started up.

Here, the concrete processing of the step SP56 described above (that is, the start-up processing of the module) is shown in FIG. 27. As shown in FIG. 27, when the displayed resultant clip is selected, the CPU 21 reads out the clip management data of the selected resultant clip at step SP61 entering from step SP60. Next, at step SP62, the CPU 21 refers a module ID code registered in the clip management data and starts up the module corresponding to the module ID code (that is, the composite module CM or the special effect module SM) at step SP63, to display the content of the edit processing of the resultant clip on the time line window of the GUI.

Figure 28:
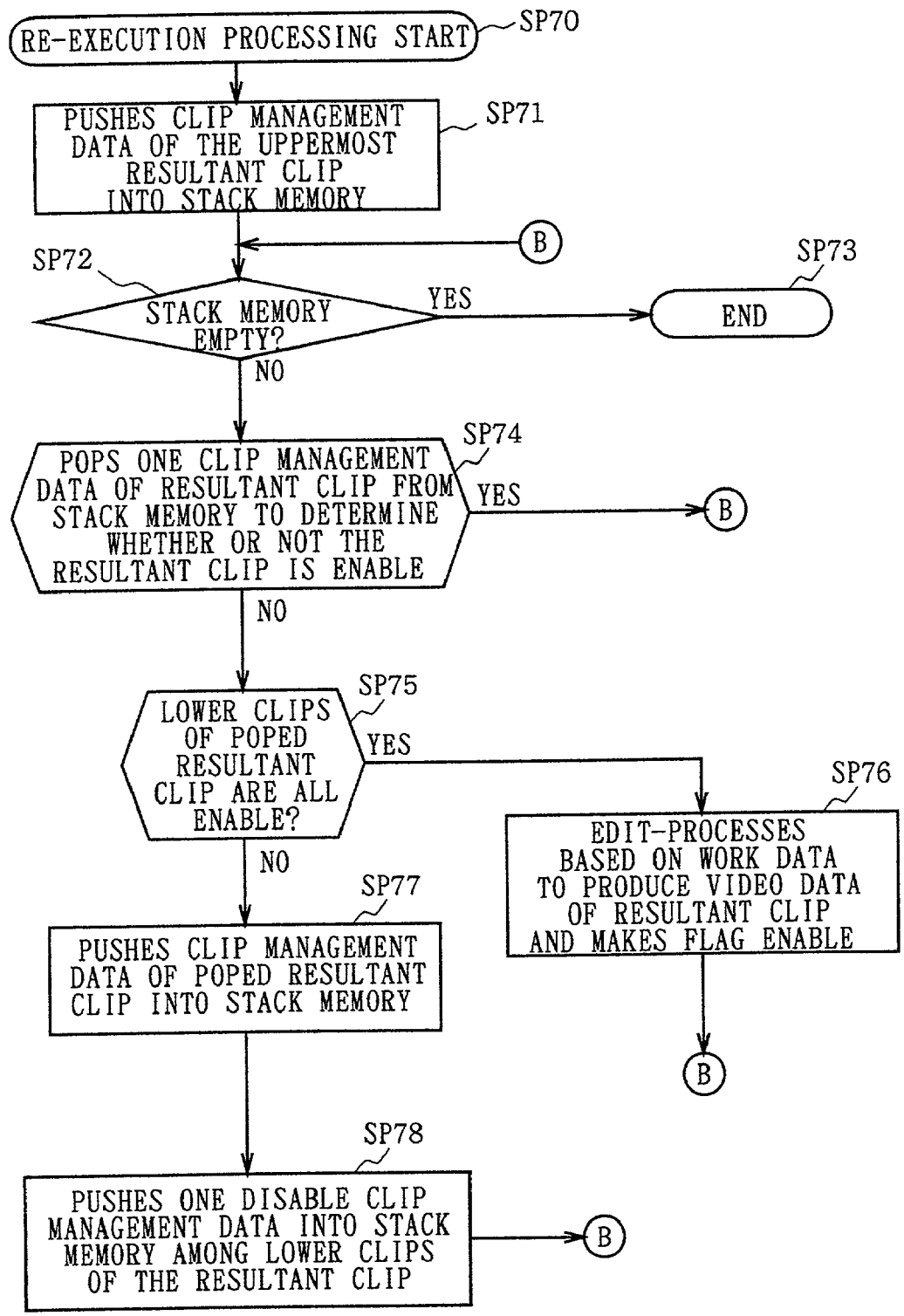
FIG. 28 is a flowchart explaining the operation in the re-execution processing.

Then, the concrete processing of step SP59 described above (i.e., the re-execution processing) is shown in FIG. 28. However, in FIG. 28, there is the relation between clips shown in FIG. 26, and at the same time the resultant clips FC-E, FC-D, FC-C, FC-B, and FC-A are all disable by the processing of step SP54 explained above.

As shown in FIG. 28, when the re-execution is instructed, the CPU 21 forms a stack memory on the RAM 21B and pushes the clip management data of the resultant clip positioned at the uppermost of the clip tree onto the stack memory. For example, in the example shown in FIG. 26, since the resultant clip FC-A is at the uppermost position, the clip management data of the resultant clip FC-A is pushed on the stack memory. Note that pushing means that data is piled up in the stack memory space.

At next step SP72, the CPU 21 determines whether or not the stack memory is empty. In the present state, at step SP71, data exists since the clip management data is pushed onto the stack memory, so that the negative result is obtained. Thereby, the CPU 21 proceeds to step SP74.

At step SP74, the CPU 21 pops the clip management data for one clip from the stack memory, and determines whether or not the clip is enable based on the enable/disable flag of the clip management data. In the example shown in FIG. 26, since the resultant clip FC-A is disable, the negative result is obtained and the CPU 21 proceeds to step SP75. Note that popping means that the data piled up in the stack memory space is read out from the uppermost data.

At step SP75, the CPU 21 determines whether or not the lower clip of the resultant clip is all enable based on the clip management data read out at the former step SP74. In this case, the CPU 21 refers the child link ID code registered in the clip management data of the resultant clip to determine the lower clip based on the clip ID code registered there, and refers the enable/disable flag of the lower clip from the clip database to determine whether or not the lower clips are all enable clips. In the example shown in FIG. 26, the resultant clip FC-B being the lower clip of the resultant clip FC-A is disable, so that the negative result is obtained and the CPU 21 proceeds to next step SP77.

At step SP77, the CPU 21 pushes again the clip management data of the resultant clip popped before, and proceeds to next step SP78. In the example shown in FIG. 26, the clip management data of the resultant clip FC-A is pushed again onto the stack memory. At step SP78, the CPU 21 pushes one clip management data of the disable clip among the lower clips of the resultant clip re-pushed at step SP77 onto the stack memory. In the example shown in FIG. 26, the lower clip FC-B of the resultant clip FC-A is disable, so that the clip management data of the resultant clip FC-B is pushed onto the stack memory.

Next, the CPU 21 returns to step SP72 again to determine whether or not the stack memory is empty. In the present state, since the clip management data exists in the stack memory, the negative result is obtained and proceeds to step SP74. At step SP74, the CPU 21 pops the clip management data for one clip from the stack memory, and determines whether or not the clip is enable based on the enable/disable flag of the clip management data. In the example shown in FIG. 26, since the clip management data of the resultant clip FC-B is read out but the resultant clip FC-B is disable, the negative result is obtained and proceeds to step SP75.

At step SP75, the CPU 21 determines whether or not the lower clips of the resultant clip are all enable based on the clip management data read out at the former step SP74. In the example shown in FIG. 26, the resultant clips FC-C and FC-D being the lower clips of the resultant clip FC-B is disable, so that the negative result is obtained and proceeds to step SP77.

At step SP77, the CPU 21 pushes again the clip management data of the resultant clip popped before, and proceeds to next step SP78. In the example shown in FIG. 26, the clip management data of the resultant clip FC-B is pushed again. At next step SP78, the CPU 21 pushes one clip management data of the disable clip among the lower clips of the resultant clip re-pushed at step SP77 onto the stack memory. In the example shown in FIG. 26, the clip management data of the resultant clip FC-C is pushed.

Next, the CPU 21 returns to step SP72 again to determine whether or not the stack memory is empty. In the present state, the negative result is obtained since it is not empty, and proceeds to step SP74. At step SP74, the CPU 21 pops the clip management data for one clip from the stack memory, and determines whether or not the resultant clip is enable based on the clip management data. In the example shown in FIG. 26, since the clip management data of the resultant clip FC-C is read out but the resultant clip FC-C is disable, the negative result is obtained and proceeds to step SP75.

At step SP75, the CPU 21 determines whether or not the lower clips of the resultant clip are all enable based on the clip management data read out at the former step SP74. In the example shown in FIG. 26, the resultant clip FC-E being the lower clip of the resultant clip FC-C is disable, so that the negative result is obtained and proceeds to step SP77.

At step SP77, the CPU 21 pushes again the clip management data of the resultant clip popped before onto the stack memory, and proceeds to next step SP78. In the example shown in FIG. 26, the clip management data of the resultant clip FC-C is pushed again. At next step SP78, the CPU 21 pushes one clip management data of the disable clip among the lower clips of the resultant clip re-pushed at step SP77 onto the stack memory. In the example shown in FIG. 26, the clip management data of the resultant clip FC-E is pushed.

Next, the CPU 21 returns to step SP72 again to determine whether or not the stack memory is empty. In the present state, the negative result is obtained since it is not empty, and proceeds to next step SP74. At step SP74, the CPU 21 pops the clip management data for one clip from the stack memory, and determines whether or not the resultant clip is enable based on the clip management data. In the example shown in FIG. 26, since the resultant clip FC-E is read out but the resultant clip FC-E is disable, the negative result is obtained to proceed to step SP75.

At step SP75, the CPU 21 determines whether or not the lower clips of the resultant clip are all enable based on the clip management data read out at the former step SP74. In the example shown in FIG. 26, since the clips MC-E1, MC-E2, and FC-G which are lower clips of the resultant clip FC-E are all enable, the affirmative result is obtained, and proceeds to step SP76.

At step SP76, the CPU 21 performs the edit processing using the clip video data of the clip specified as a material based on the work data registered in the clip management data, so as to produce the clip video data of the resultant clip and changes the enable/disable flag of the clip management data of the resultant clip into enable. In the example shown in FIG. 26, the edit processing is performed by using the clips FC-G, MC-E1, and MC-E2 specified as materials to produce the clip video data of the resultant clip FC-E and change the enable/disable flag of the resultant clip FC-E into enable.

Next, the CPU 21 returns to step SP72 again to determine whether or not the stack memory is empty. In the present state, the negative result is obtained since it is not empty, and proceeds to step SP74. At step SP74, the CPU 21 pops the clip management data for one clip from the stack memory, and determines whether or not the resultant clip is enable based on the clip management data. In the example shown in FIG. 26, since the clip management data of the resultant clip FC-C is read out but the resultant clip FC-C is disable, the negative result is obtained and proceeds to step SP75.

At step SP75, the CPU 21 determines whether or not the lower clips of the resultant clip are all enable based on the clip management data read out at the former step SP74. In the example shown in FIG. 26, the clips FC-E and MC-C1 being the lower clips of the resultant clips FC-C are enable, so that the affirmative result is obtained and proceeds to step SP76.

At step SP76, the CPU 21 performs the edit processing using the clip video data of the clip specified as a material based on the work data registered in the clip management data, so as to produce the clip video data of the resultant clip and changes the enable/disable flag of the clip management data of the resultant clip into enable. In the example shown in FIG. 26, the edit processing is performed by using the clips FC-E and MC-C1 to produce the clip video data of the resultant clip FC-C and change-the enable/disable flag of the resultant clip FC-C into enable.

Next, the CPU 21 returns to step SP72 again to determine whether or not the stack memory is empty. In the present state, the negative result is obtained since it is not empty, and proceeds to step SP74. At step SP74, the CPU 21 pops the clip management data for one clip from the stack memory, and determines whether or not the resultant clip is enable based on the clip management data. In the example shown in FIG. 26, since the clip management data of the resultant clip FC-B is read out but the resultant clip FC-B is disable, the negative result is obtained and proceeds to step SP75.

At step SP75, the CPU 21 determines whether or not the lower clips of the resultant clip are all enable based on the clip management data read out at the former step SP74. In the example shown in FIG. 26, the resultant clip FC-D being the lower clip is disable, so that the negative result is obtained and proceeds to step SP77.

At step SP77, the CPU 21 pushes again the clip management data of the resultant clip onto the stack memory similarly, and at next step SP78, pushes the clip management data of the disable lower clip onto the stack memory.

Next, the CPU 21 returns to step SP72 again to determine whether or not the stack memory is empty. In the present state, the negative result is obtained since it is not empty, and proceeds to step SP74. At step SP74, the CPU 21 pops the clip management data for one clip from the stack memory, and determines whether or not the resultant clip is enable based on the clip management data. In the example shown in FIG. 26, since the resultant clip FC-D is read out but the resultant clip FC-D is disable, the negative result is obtained and proceeds to step SP75.

At step SP75, the CPU 21 determines whether or not the lower clips of the resultant clip are all enable based on the clip management data read out at the former step SP74. In the example shown in FIG. 26, the clips FC-E, FC-F, MC-D1 and MC-D2 being lower clips of the resultant clip FC-D are all enable, so that the affirmative result is obtained and proceeds to step SP76.

At step SP76, the CPU 21 performs the edit processing using the clip video data of the clip specified as a material based on the work data registered in the clip management data, so as to produce the clip video data of the resultant clip and changes the enable/disable flag of the clip management data of the resultant clip into enable. In the example shown in FIG. 26, the edit processing is performed by using the clips FC-E, FC-F, MC-D1 and MC-D2 to produce the clip video data of the resultant clip FC-D and change the enable/disable flag of the resultant clip FC-D into enable.

Next, the CPU 21 returns to step SP72 again to determine whether or not the stack memory is empty. In the present state, the negative result is obtained since it is not empty, and proceeds to step SP74. At step SP74, the CPU 21 pops the clip management data for one clip from the stack memory, and determines whether or not the resultant clip is enable based on the clip management data. In the example shown in FIG. 26, since the clip management data of the resultant clip FC-B is read out but the resultant clip FC-B is disable, the negative result is obtained and proceeds to step SP75.

At step SP75, the CPU 21 determines whether or not the lower clips of the resultant clip are all enable based on the clip management data read out at the former step SP74. In the example shown in FIG. 26, the resultant clips FC-C and FC-D being lower clips are enable, so that the affirmative result is obtained and proceeds to step SP76.

At step SP76, the CPU 21 performs the edit processing using the clip video data of the clip specified as a material based on the work data registered in the clip management data, so as to produce the clip video data of the resultant clip and changes the enable/disable flag of the clip management data of the resultant clip into enable. In the example shown in FIG. 26, the edit processing is performed by using the clips FC-C and FC-D to produce the clip video data of the resultant clip FC-B and change the enable/disable flag of the resultant clip FC-B into enable.

Next, the CPU 21 returns to step SP72 again to determine whether or not the stack memory is empty. In the present state, the negative result is obtained since it is not empty, and proceeds to step SP74. At step SP74, the CPU 21 pops the clip management data for one clip from the stack memory, and determines whether or not the resultant clip is enable based on the clip management data. In the example shown in FIG. 26, since the clip management data of the resultant clip FC-A is read out but the resultant clip FC-A is disable, the negative result is obtained and proceeds to step SP75.

At step SP75, the CPU 21 determines whether or not the lower clips of the resultant clip are all enable based on the clip management data read out at the former step SP74. In the example shown in FIG. 26, the resultant clip FC-B being lower clip is enable, so that the affirmative result is obtained and proceeds to step SP76.

At step SP76, the CPU 21 performs the edit processing using the clip video data of the clip specified as a material based on the work data registered in the clip management data, so as to produce the clip video data of the resultant clip and changes the enable/disable flag of the clip management data of the resultant clip into enable. In the example shown in FIG. 26, the edit processing is performed by using the resultant clip FC-B to produce the clip video data of the resultant clip FC-A and change the enable/disable flag of the resultant clip FC-A into enable.

Next, the CPU 21 returns to step SP72 again to determine whether or not the stack memory is empty. In the present state, the stack memory is empty since the all data to the uppermost resultant clip are read out by pop processing described above, and an affirmative result is obtained. Therefore, the CPU 21 proceeds to step SP73 to complete the re-execution processing.

In addition, at step SP74, if it is determined that the clip of the clip management data read from the stack memory is enable, the CPU 21 returns to step SP72. For example, when the uppermost resultant clip is enable in the clip tree, the clip management data is pushed onto the stack memory by the processing of step SP71. However, since the affirmative result is obtained by determination of step SP74, the CPU 21 returns to step SP72 to complete the re-execution processing immediately because the affirmative result is obtained. In this way, when the uppermost resultant clip is enable, the re-execution processing is not performed actually.

Figure 29:
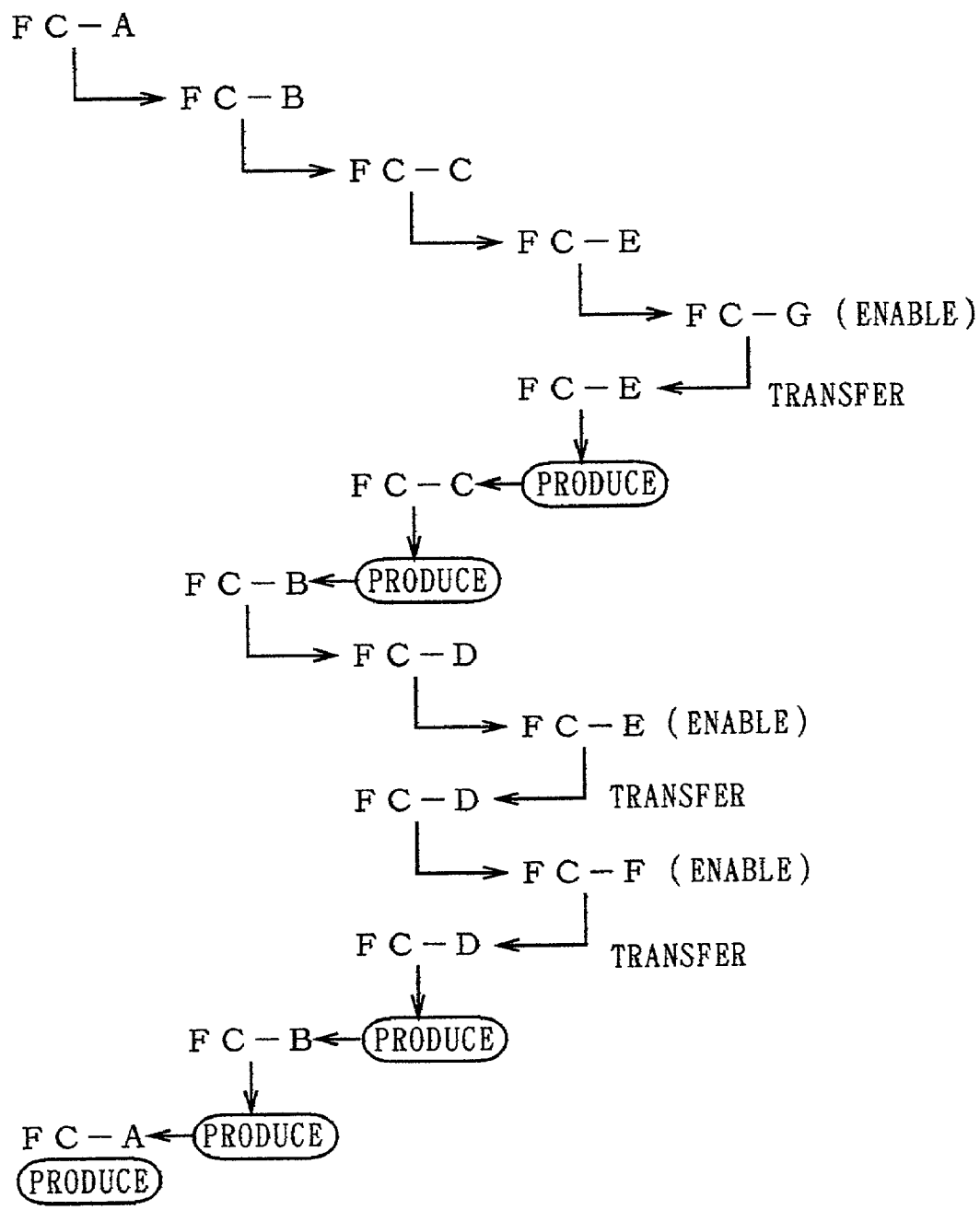
FIG. 29 is a schematic diagram showing the re-execution processing schematically.

Here, the content of the flowchart of the re-execution processing described above is shown in FIG. 29 schematically. In the editing system 1 according to this invention, when the uppermost resultant clip FC-A is disable, it is determined whether the resultant clip FC-B which is the lower clip of the clip FC-A is enable or not, and when it is disable, it is determined whether the clip FC-C which is the lower clip of the clip FC-B is enable or not. As a result, when the resultant clip FC-C is disable, it is determined whether the clip FC-E which is the lower clip of the resultant clip FC-C is enable or not, and when the resultant clip FC-E is disable, it is determined whether the clip FC-G which is the lower clip of the resultant clip FC-E is enable or not.

As a result, if the resultant clip FC-G is enable, the clip video data of the resultant clip is transferred to execute the edit processing based on the clip video data again, so as to produce the clip video data of the resultant clip FC-E corresponding to the upper clip. When the clip video data of the resultant clip FC-E is produced, the edit processing based on the clip video data is executed again, so as to produce the clip video data of the resultant clip FC-C corresponding to the upper clip. When the clip video data of the resultant clip FC-C is produced, the edit processing based on the clip video data is tried to be executed again. However, since the resultant clip FC-D which is the other lower clip is still disable, it is determined whether the resultant clip FC-E which is the lower clip of the resultant clip FC-D is enable or not.

If the resultant clip FC-E is enable, the clip video data of the resultant clip FC-E is transferred. Also, it is determined whether the resultant clip FC-F which is the other lower clip of the resultant clip FC-D is enable or not, and when it is enable, the clip video data of the resultant clip FC-F is also transferred. When the clip video data from the lower clips FC-E and FC-F are transferred, the edit processing based on the clip video data is executed again, so as to produce the clip video data of the resultant clip FC-D corresponding to the upper clip. Next, when the clip video data of the resultant clip FC-D is produced, the edit processing based on the clip video data is executed again, so as to produce the clip video data of the resultant clip FC-B corresponding to the upper clip. Next, when the clip video data of the resultant clip FC-B is produced, the edit processing based on the clip video data is executed again, so as to produce the clip video data of the resultant clip FC-A corresponding to the upper clip.

In this way, in the editing system 1 according to this invention, if the content of the edit processing of the resultant clip FC-E is modified, the flag for identifying the resultant clip FC-E is changed to disable and the flags for identifying the resultant clips FC-C, FC-D, FC-B, and FC-A which are linked to the upper position of the resultant clip FC-E are all changed to disable. Then, the re-execution processing is specified by selecting the command of the view or the all view, is determined whether the clips is enable or not from the uppermost resultant clip FC-A toward the lower clips. When reached to the clip having all enable clips linked at the lower position, the edit processing of the clip is re-executed to change the clip into the enable clip, and the edit processing of the clip which are linked at the upper position is successively re-executed to change all clips which are linked at the upper position into enable clips. Thus, in the editing system 1 according to this invention, such processing is performed so as to easily modify the edit result once produced, even if the operator does not remember the relation between clips conventionally.

(7) Operation and Effect of the Editing System

With the above construction, when the editing system 1 is started up, the top menu is displayed on the display 2B of the work station 2. An operator selects the command of starting up a desired module on the top menu, and starts up the module suitable to the edit work which will be performed. When the module is started up, the GUI for editing is displayed on the display 2B of the work station 2.

For example, when the composite module CM is started up, the GUI shown in FIG. 10 is displayed on the display 2B. in the GUI for composite processing, the time line window 34 only for the composite processing is displayed, and the clip being a material can be easily specified or a desired composite processing can be specified. At this time, in the GUI, the clips registered as the clip database CDB are displayed on the clip tree window 31 or the library window 33, and if a desired clip is selected among from these clips as a material and placed at the video area of the time line window 34, the material of composite processing can be easily specified.

Further, to set the parameter of the composite processing specified on the time line window 34, the parameter is set with viewing the screen by using the parameter setting window 35 displayed on the same GUI, so that a desired composite parameter can be set.

Further, on the clip tree window 31, the clip tree such that the relation between respective clips registered in the clip database CDB is understood is displayed. When viewing the clip tree, it can be easily obtained that which of clips is each clip produced from as a material.

Similarly, when the special effect module SM is started up, the GUI shown in FIG. 11 is displayed on the display 2B. Also in the GUI of the special effect processing, the time line window 41 only for the special effect is displayed, and if you operates in accordance with the time line window 41, the clip being a material can be easily specified or a desired special effect processing can be specified. Moreover, also in the GUI of the special effect processing, the clip tree window 31 and the library window 33 are provided, so that the desired clip registered in the clip database CDB can be easily selected as a material.

Similarly, when the edit module EM is started up, the GUI shown in FIG. 12 is displayed on the display 2B. Also in the GUI of the edit processing, the time line window 51 only for the edit processing is displayed, and if you operates in accordance with the time line window 51, the clip being a material can be easily specified or a desired edit processing can be specified.

In this way, in the editing system 1, the desired material or the edit content is specified with viewing the GUI displayed on the display 2B of the work station 2, so as to easily perform the desired edit work. Further, in the editing system 1, various instructions relating to the edit work can be input through the work station 2, and the edit work can be performed easily even if the operator does not operate intentionally various devices as a conventional way.

Therefore, in the editing system 1, the edit work can be performed easier and higher in speed as compared with the conventional one. Also, the many types of materials registered in the clip database CDB are used to obtain the complicated and high quality video data.

On the other hand, in the editing system 1, each clip being as a material is managed with the hierarchical structure based on the relation between clips. More specifically, it is understood that which of clips is the clip linked to. Therefore, even if the content of the edit is changed after the edit work has been performed once, the associated clips can be changed automatically by the management of the hierarchical structure. Thereby, the edit work can be easily changed and the edit work is performed efficiently even if the operator does not intentionally remember the relation between clips. Furthermore, even if the edit content is changed, the original work data relating to the edit is remained so as to return it to the original state after the edit content has been changed. Further, the relation between clips is managed with the hierarchical structure, so that the edit work is successively performed based on the relation between clips managed with the hierarchical structure to perform the complicated edit work easily.

In accordance with the above construction, the work station 2 displaying the GUI for each function is provided to enable to input the various edit instructions in accordance with the screen of the GUI, so that the desired edit work can be performed without the operation of devices as conventional one, and the editing system which significantly improves the usability can be realized.

Further, respective clips being as materials are managed with the hierarchical structure based on the relation between clips, so that the complete edit work can be performed easily and the edit work can be changed easily, thereby the editing system which can perform the complicated edit work easily and rapidly can be realized.

INDUSTRIAL APPLICABILITY

In the broadcasting station, etc., this invention can be utilized in the complicated edit work using a plurality of materials.

The invention claimed is:

1. An editing system comprising:
a database for registering information for each of a plurality of clips;
a plurality of modules for selectively performing one or more of editing composing, and special effects processing on said plurality of clips to produce a first resultant clip, said modules being operable to perform processing on said first resultant clip to produce a second resultant clip; said plurality of modules comprising an edit module for performing said editing processing of said plurality of clips, a composite module for performing said composing processing of said clips, and a special effect module for performing said special effects processing of said clips;
display means for displaying a graphical user interface respectively representing said edit module, said composite module, and said special effect module on a display;
said display means further displaying a table of horizontally aligned rows and vertically aligned columns, said table including at least automatically generated textual indicia identifying said plurality of clips as being material clips or resultant clips including those clips subjected to said processing to produce said first resultant clip, and said indicia indicating the modules used to process said clips, said table further identifying the second resultant clip produced as a result of processing performed on said first resultant clip, and indicating the type of processing performed thereon, said table further indicating a duration of said plurality of clips and having an enable/disable flag for each of said plurality of clips; and
control means for controlling said plurality of modules based on said information registered in said database; said control means updates content of a first resultant clip registered in the database, and updates content of resultant clips produced from said first resultant clip; said control means overwrites content of a first resultant clip registered in the database with content of a new resultant clip, and updates content of resultant clips produced from said first resultant clip; said control means stores said overwritten content of said first resultant clip and said updated content of said resultant clips in the database.

2. An editing method comprising:
registering information for each of a plurality of clips in a database;
displaying a graphical user interface respectively representing editing, composing and special effects processing;
controlling one or more of editing, composing, and special effects processing on said plurality of clips based on said information registered in said database;
selectively performing said editing, composing, and special effects processing on said plurality of clips to produce a first resultant clip using a plurality of modules said processing being performable on said first resultant clip to produce a second resultant clip;
displaying a table of horizontally aligned rows and vertically aligned columns, said table including at least automatically generated textual indicia identifying said plurality of clips as being material clips or resultant clips including those clips subjected to said processing to produce said first resultant clip, and said indicia indicating the modules used to process said clips, said table further identifying the second resultant clip produced as a result of processing performed on said first resultant clip, and indicating the type of processing performed thereon, said table further indicating a duration of said plurality of clips and having an enable/disable flag for each of said plurality of clips;
updating content of said first resultant clip registered in the database;
overwriting content of said first resultant clip registered in the database with content of a new resultant clip;
updating content of resultant clips produced from said first resultant clip; and
storing said overwritten content of said first resultant clip and said updated content of said resultant clips in the database.

* * * * *